US011523487B2

(12) United States Patent
Kim et al.

(10) Patent No.: US 11,523,487 B2
(45) Date of Patent: Dec. 6, 2022

(54) LIGHTING DEVICE AND CONTROLLING METHOD THEREOF

(71) Applicant: SOLUM CO., LTD., Yongin-si (KR)

(72) Inventors: Jurae Kim, Suwon-si (KR); Euiseok Kim, Suwon-si (KR); Semi Lee, Suwon-si (KR)

(73) Assignee: SOLUM CO., LTD., Yongin-si (KR)

( * ) Notice: Subject to any disclaimer, the term of this patent is extended or adjusted under 35 U.S.C. 154(b) by 0 days.

(21) Appl. No.: 17/322,840

(22) Filed: May 17, 2021

(65) Prior Publication Data
US 2022/0039244 A1 Feb. 3, 2022

(30) Foreign Application Priority Data

Jul. 31, 2020 (KR) .......................... 10-2020-0096094
Dec. 15, 2020 (KR) .......................... 10-2020-0175798

(51) Int. Cl.
*H05B 47/185* (2020.01)
*H04L 67/125* (2022.01)
(Continued)

(52) U.S. Cl.
CPC ......... *H05B 47/185* (2020.01); *H04L 67/125* (2013.01); *H05B 45/10* (2020.01); *H05B 45/20* (2020.01); *H05B 47/19* (2020.01)

(58) Field of Classification Search
CPC .. G06F 3/0482; G06F 3/04883; G06F 3/0481; G06F 3/04845; G06F 3/0483;
(Continued)

(56) References Cited

U.S. PATENT DOCUMENTS 7,936,135 B2 * 5/2011 Hum ...................... H05B 45/37
315/297
9,844,113 B2 12/2017 Yan et al.
(Continued)

FOREIGN PATENT DOCUMENTS

JP 2009530790 A 8/2009
JP 6002699 B2 10/2016
(Continued)

OTHER PUBLICATIONS

Final Office Action for U.S. Appl. No. 17/322,791, filed May 17, 2021, on behalf of Solum Co., Ltd. dated Jan. 12, 2022. 10 Pages.
(Continued)

*Primary Examiner* — Monica C King
(74) *Attorney, Agent, or Firm* — Steinfl + Bruno LLP

(57) ABSTRACT

Disclosed is a lighting device. The lighting device includes a light emitting element, a power unit to supply power to the light emitting element, a single communication port and a processor to, when a user input signal to adjust brightness of the light emitting element is received from an external communication device connected by the single communication port, generate a control signal corresponding to the received user input signal, control the power unit to adjust brightness of the light emitting element based on the control signal, and the signal communication port may be connected to the processor via a single communication line.

10 Claims, 13 Drawing Sheets

(51) Int. Cl.
*H05B 45/10* (2020.01)
*H05B 45/20* (2020.01)
*H05B 47/19* (2020.01)

(58) Field of Classification Search
CPC ............ G06F 3/04886; G06F 13/4282; G06F 2203/04808; G06F 3/011; G06F 3/167; G06F 2203/04101; G06F 3/0425; G06F 3/0428; G06F 3/0487; G06F 3/013; G06F 1/3287; G06F 3/048; G06F 3/14; G06F 1/324; G06F 3/017; G06F 9/4411; G06F 3/0488; G06F 9/4401; G06F 1/3296; G06F 11/3409; G06F 11/3442; G06F 11/3452; G06F 11/3466; G06F 12/023; G06F 12/0638; G06F 13/4027; G06F 15/781; G06F 2201/865; G06F 2201/88; G06F 2201/885; G06F 2212/205; G06F 3/04847; G06F 13/4068; G06F 3/04817; G06F 3/04842; G06F 1/3265; G06F 13/385; G06F 3/016; G06F 3/162; G06F 3/165; G06F 40/106; G06F 40/177; G06F 40/18; G06F 40/197; G06F 3/04186; G06F 11/30; G06F 13/387; G06F 3/0412; G06F 3/0416; G06F 3/04166; G06F 3/0418; G06F 1/163; G06F 2213/0042; G06F 3/1446; G06F 1/1605; G06F 1/1616; G06F 13/4022; G06F 13/42; G06F 13/4295; G06F 3/0661; G06F 8/60; G06F 1/1641; G06F 3/012; G06F 9/445; G06F 1/1643; G06F 1/26; G06F 1/3203; G06F 13/14; G06F 13/36; G06F 13/4045; G06F 21/10; G06F 2221/0708; G06F 2221/0773; G06F 9/451; G06F 9/45504; G06F 1/206; G06F 1/3206; G06F 1/3212; G06F 1/3234; G06F 11/3024; G06F 11/3058; G06F 12/06; G06F 2203/04803; G06F 3/03545; G06F 8/20; G06F 8/54; G06F 9/44521; G06F 9/4484; G06F 9/45529; G06F 9/45537; G06F 1/266; G06F 1/28; G06F 1/3253; G06F 13/1673; G06F 13/20; G06F 13/287; G06F 13/4072; G06F 13/4291; G06F 21/31; G06F 21/60; G06F 21/78; G06F 2213/0026; G06F 2213/4002; G06F 3/147; G06F 9/4418; G06F 9/44505; G06F 1/3243; G06F 13/364; G06F 13/40; G06F 13/4004; G06F 13/404; G06F 13/4221; G06F 16/9566; G06F 21/32; G06F 21/575; G06F 2203/04105; G06F 3/1423; G06F 9/3009; G06F 9/30098; G06F 9/30189; G06F 9/3851; G06F 9/3877; G06F 9/4413; G06F 1/16; G06F 1/1686; G06F 1/1688; G06F 1/32; G06F 1/3231; G06F 1/3262; G06F 1/3278; G06F 11/1438; G06F 11/1441; G06F 11/2284; G06F 11/3051; G06F 13/1678; G06F 13/362; G06F 13/4265; G06F 16/00; G06F 16/95; G06F 2009/45595; G06F 21/568; G06F 21/6245; G06F 21/85; G06F 2203/014; G06F 2203/04106; G06F 3/005; G06F 3/0202; G06F 3/021; G06F 3/0219; G06F 3/0238; G06F 3/0304; G06F 3/0325; G06F 3/03547; G06F 3/0362; G06F 3/038; G06F 3/0414; G06F 3/04812; G06F 3/0484; G06F 3/0486; G06F 7/00; G06F 8/38; G06F 9/4406; G06F 9/448; G06F 9/452; G06F 9/45558; H05B 45/325; H05B 45/3725; H05B 47/19; H05B 45/20; H05B 45/395; H05B 33/08; H05B 45/00; H05B 45/24; H05B 45/36; H05B 45/46; H05B 45/56; H05B 45/10; H05B 45/12; H05B 45/37; H05B 45/375; H05B 45/50; H05B 47/11; H05B 47/115; H05B 47/155; H05B 47/18; H05B 47/195; H05B 31/50; H05B 33/04; H05B 45/3575; H05B 45/48; H05B 47/10; H05B 47/105; H05B 47/165; H05B 47/17; H05B 47/185; G06T 2207/10024; G06T 2207/10048; G06T 2207/30232; G06T 2207/10016; G06T 7/586; G06T 1/60; G06T 3/4015; G06T 2207/10028; G06T 2207/10152; G06T 5/20; G06T 7/20; G06T 11/60; G06T 1/0007; G06T 11/206; G06T 17/00; G06T 2200/24; G06T 2207/20081; G06T 13/40; G06T 17/20; G06T 19/20; G06T 2213/04; G06T 7/254; G06T 7/514; G06T 2207/20084; G06T 2207/20208; G06T 5/009; G06T 7/50; G06T 7/70; G06T 2207/10021; G06T 2207/30201; G06T 2207/30244; G06T 3/4053; G06T 7/0002; G06T 7/0004; G06T 7/0008; G06T 15/506; G06T 2207/20104; G06T 2207/30121; G06T 7/11; G06T 7/13; G06T 19/006; G06T 2207/30108; G06T 3/403; G06T 7/0012; G06T 7/73; G06T 9/00; G06T 1/0014; G06T 1/20; G06T 11/00; G06T 15/005; G06T 2200/04; G06T 2207/10012; G06T 2207/20024; G06T 2207/20048; G06T 2207/20056; G06T 2007/30024; G06T 2207/30041; G06T 3/4007; G06T 7/00; G06T 7/0006; G06T 7/521; G06T 9/002; G06T 9/007; B60Q 1/2611; B60Q 1/0035; B60Q 1/52; B60Q 1/0041; B60Q 1/22; B60Q 1/34; B60Q 1/44; B60Q 2400/20; B60Q 1/0076; B60Q 1/0088; B60Q 1/46; B60Q 1/263; B60Q 1/2696; B60Q 1/085; B60Q 1/143; B60Q 1/18; B60Q 1/2607; B60Q 1/2615; B60Q 2300/052; B60Q 2300/054; B60Q 2300/056; B60Q 2300/112; B60Q 2300/122; B60Q 2300/132; B60Q 2300/134; B60Q 2300/21; B60Q 2300/312; B60Q 2300/314; B60Q 2300/322; B60Q 2300/331; B60Q 2300/332; B60Q 2300/3321; B60Q 2300/41; B60Q 2300/42; B60Q 2900/10; B60Q 2900/30

See application file for complete search history.

(56) References Cited

U.S. PATENT DOCUMENTS

2010/0327766 A1* 12/2010 Recker .................. H02J 50/20
362/20
2015/0195883 A1* 7/2015 Harris .................. H05B 45/12
315/158
2015/0351191 A1* 12/2015 Pope ...................... H05B 45/37
315/294

(56) References Cited

U.S. PATENT DOCUMENTS

2016/0330825 A1* 11/2016 Recker .................. H05B 47/16
2019/0320515 A1* 10/2019 Sadwick ................ H05B 45/37
2021/0382736 A1* 12/2021 Sanders ................. G06F 3/165

FOREIGN PATENT DOCUMENTS

| KR | 20140132491 A | 11/2014 |
| KR | 101584936 B1 | 1/2016 |
| KR | 101648788 B1 | 8/2016 |
| KR | 101738784 B1 | 5/2017 |
| KR | 101826752 B1 | 3/2018 |
| KR | 102094860 B1 | 3/2020 |
| WO | 2007/107958 A1 | 9/2007 |

OTHER PUBLICATIONS

Non-Final Office Action for U.S. Appl. No. 17/322,791, filed May 17, 2021, on behalf of Solum Co., Ltd. dated Sep. 30, 2021. 10 Pages.

\* cited by examiner

FIG. 6
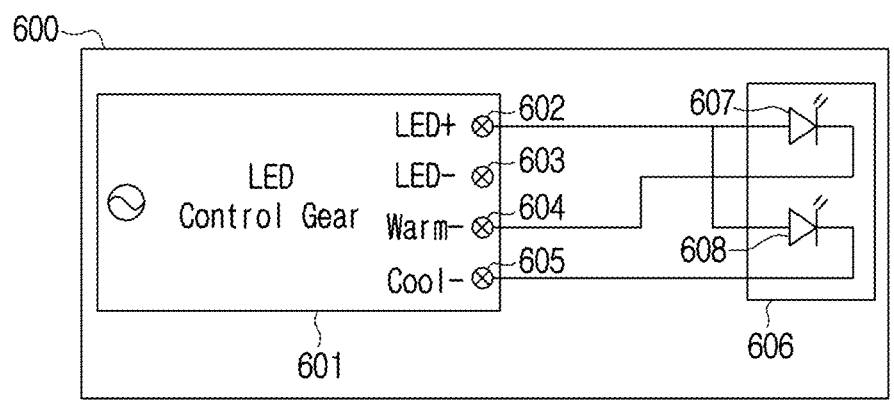
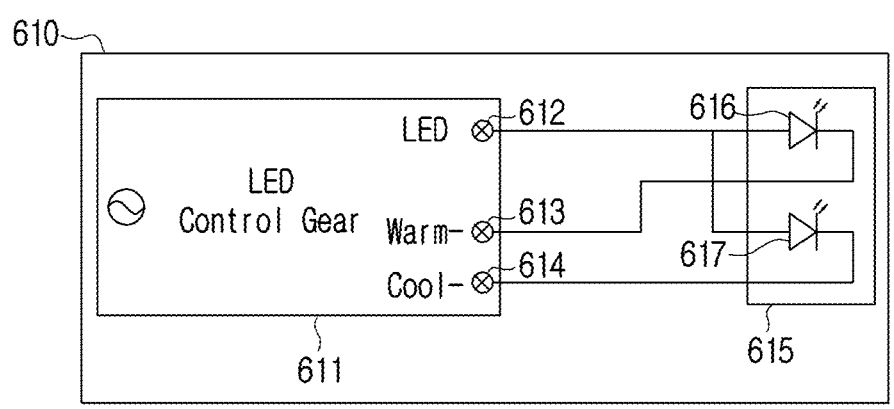
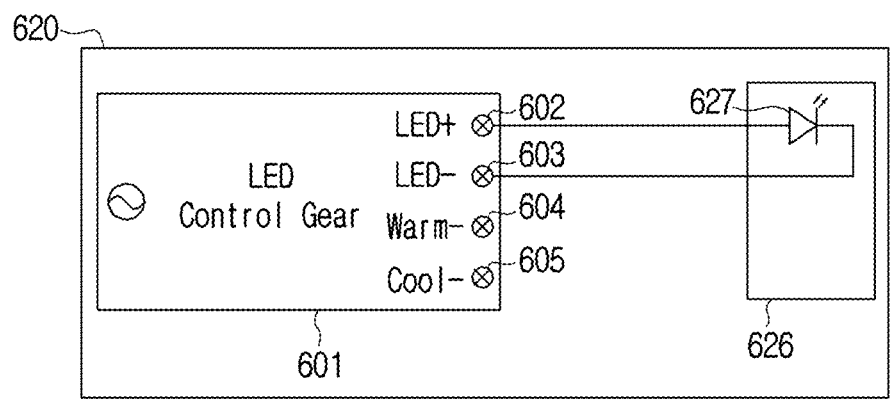

LIGHTING DEVICE AND CONTROLLING METHOD THEREOF

CROSS-REFERENCE TO RELATED APPLICATION(S)

This application is based on and claims priority under 35 U.S.C. § 119 to Korean Patent Application No. 10-2020-0175798, filed on Dec. 15, 2020 and Korean Patent Application No. 10-2020-0096094, filed on Jul. 31, 2020, in the Korean Intellectual Property Office, the disclosures of which are incorporated by reference herein in their entireties.

BACKGROUND OF THE INVENTION

Field

The disclosure relates to a lighting device and a controlling method and, more particularly to, a lighting device for controlling brightness of a light emitting element based on a control signal corresponding to a user input signal and a controlling method thereof.

Description of the Prior Art

A lighting device may include a light emitting element and a main circuit for controlling the light emitting element. The main circuit may include a communication module for receiving a user input signal (user command).

A variety of communication modules may be used in the Internet of Things (IoT) system. For example, according to an embodiment, various communication modules such as infrared, Bluetooth, Wi-Fi, or the like, may be used. The lighting device may be implemented in a form of performing communication with a remote control device by a specific communication method. However, with the corresponding communication method, communication may be performed only by a predetermined communication method, and it may be difficult to transmit and receive information by another communication method.

For example, if a lighting device includes only an infrared communication module, the lighting device may not exchange information with an external device communicating by Bluetooth. If all of the various communication modules are included in the lighting device, there may be a problem that a size may get larger and a cost may increase. In addition, when all of the communication modules are included, there may be a drawback that the circuit configuration may become complicated and the signal processing speed may become slow.

SUMMARY OF THE INVENTION

The disclosure is purposed to provide a lighting device to control a light emitting element by receiving a standardized communication signal through a single communication port and a controlling method thereof.

According to an embodiment, a lighting device includes a light emitting element, a power unit to supply power to the light emitting element, a single communication port and a processor to, when a user input signal to adjust brightness of the light emitting element is received from an external communication device connected by the single communication port, generate a control signal corresponding to the received user input signal, control the power unit to adjust brightness of the light emitting element based on the control signal, and the signal communication port may be connected to the processor via a single communication line.

The lighting device may further include an auxiliary power unit to supply auxiliary power and a single power port, and the processor may control the auxiliary power unit to supply auxiliary power to the external communication device connected by the single power port, and the single power port may be connected to the auxiliary power unit via a single power line.

The lighting device may further include an output terminal, and the output terminal may include the single communication port and the single power port, and the processor may communicate with the external communication device through the output terminal and supplies power to the external communication device.

The output terminal may be a universal serial bus (USB) port.

The received user input signal is a signal that is processed based on a pre-decided communication protocol by the external communication device, the processor may identify whether the received user input signal is processed based on the pre-decided protocol, and when the received user input signal is not processed based on the pre-decided protocol, may process the received user input signal based on the pre-decided protocol.

The processor, when the received user input signal is not processed based on the pre-decided protocol, may generate a conversion request signal to convert the received user input signal, transmit the generated conversion request signal to the external communication device, and receive a converted user input signal from the external communication device.

The processor may receive the user input signal through the single communication line, when brightness of the light emitting element is adjusted based on the user input signal, may generate an adjustment result signal, and may transmit the adjustment result signal to the external communication device through the single communication line.

The processor may receive communication method information corresponding to the user input signal from the external communication device, identify a communication protocol corresponding to the communication method information, convert the adjustment result signal based on the identified communication protocol, and transmit the converted adjustment result signal to the external communication device through the single communication line.

The light emitting element may include a first light emitting element having a first color temperature and a second light emitting element having a second color temperature, the processor may identify a total supply current of the lighting device, identify ratio information between brightness of the first light emitting element and brightness of the second light emitting element based on the user input, and supply total supply current to the first light emitting element and the second light emitting element based on the identified ratio information.

The lighting device may further include a first switching element and a second switching element, and the processor may identify a first current supplied to the first light emitting element and a second current supplied to the second light emitting element based on the total supply current and the ratio information, supply the first current to the first light emitting element by controlling the first switching element, and supply the second current to the second light emitting element by controlling the second switching element.

A controlling method of a lighting device according to an embodiment includes receiving a user input signal to adjust brightness of a light emitting element from an external communication device connected by a single communication port of the lighting device through a single communication line which connects a processor of the lighting device and the single communication port, generating a control signal corresponding to the received user input signal, and adjusting brightness of the light emitting element based on the control signal.

The method may further include supplying auxiliary power and a single power port to the external communication device connected by a single power port of the lighting device through a single power line connecting an auxiliary power unit of the lighting device and the single power port.

The method may further include communicating with the external communication device through an output terminal including the single communication port and the single power port and supplying power to the external communication device.

The output terminal may be a universal serial bus (USB) port.

The received user input signal is a signal that is processed based on a pre-decided communication protocol by the external communication device, and the controlling method may include identifying whether the received user input signal is processed based on the pre-decided protocol, and when the received user input signal is not processed based on the pre-decided protocol, processing the received user input signal based on the pre-decided protocol.

The method may further include, when the received user input signal is not processed based on the pre-decided protocol, generating a conversion request signal to convert the received user input signal, transmitting the generated conversion request signal to the external communication device, and receiving a converted user input signal from the external communication device.

The method may further include receiving the user input signal through the single communication line, when brightness of the light emitting element is adjusted based on the user input signal, generating an adjustment result signal, and transmitting the adjustment result signal to the external communication device through the single communication line.

The method may further include receiving communication method information corresponding to the user input signal from the external communication device, identifying a communication protocol corresponding to the communication method information, converting the adjustment result signal based on the identified communication protocol, and transmitting the converted adjustment result signal to the external communication device through the single communication line.

The light emitting element may include a first light emitting element having a first color temperature and a second light emitting element having a second color temperature, the method may include identifying a total supply current of the lighting device, identifying ratio information between brightness of the first light emitting element and brightness of the second light emitting element based on the user input, and supplying total supply current to the first light emitting element and the second light emitting element based on the identified ratio information.

The method may further include identifying a first current supplied to the first light emitting element and a second current supplied to the second light emitting element based on the total supply current and the ratio information, supplying the first current to the first light emitting element by controlling the first switching element, and supplying the second current to the second light emitting element by controlling the second switching element.

BRIEF DESCRIPTION OF THE DRAWINGS

FIG. 6 illustrates various embodiments in which a first light emitting element, a second light emitting element, and a light emitting control module are connected;

DESCRIPTION OF THE PREFERRED EMBODIMENT

Embodiments of the disclosure will be described in detail.

Terms that are generally and widely used were selected as terms used in embodiments of the disclosure in consideration of functions in the disclosure, but the meaning of such terms may be understood depending on the intention of those skilled in the art, the emergence of a new technique, and the like. In addition, in a specific case, arbitrary terms may be selected. In this case, the meaning of such arbitrary terms will be described in detail in a corresponding description portion of the disclosure. Therefore, the terms used in embodiments of the disclosure should be defined on the basis of the meaning of the terms and the contents throughout the disclosure rather than simple names of the terms.

In this specification, expressions such as "have," "may have," "include," "may include" or the like represent presence of a corresponding feature (for example, components such as numbers, functions, operations, or parts) and does not exclude the presence of additional feature.

Expressions such as "at least one of A or B" and "at least one of A and B" should be understood to represent "A," "B," or "A and B."

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms such as "module," "unit," "part," and so on refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module and be realized in at least one processor.

In the following description, a "user" may refer to a person using the lighting device or a device (e.g., artificial intelligence lighting device) using the lighting device.

The embodiments will be further described with reference to the drawings.

Figure 1:
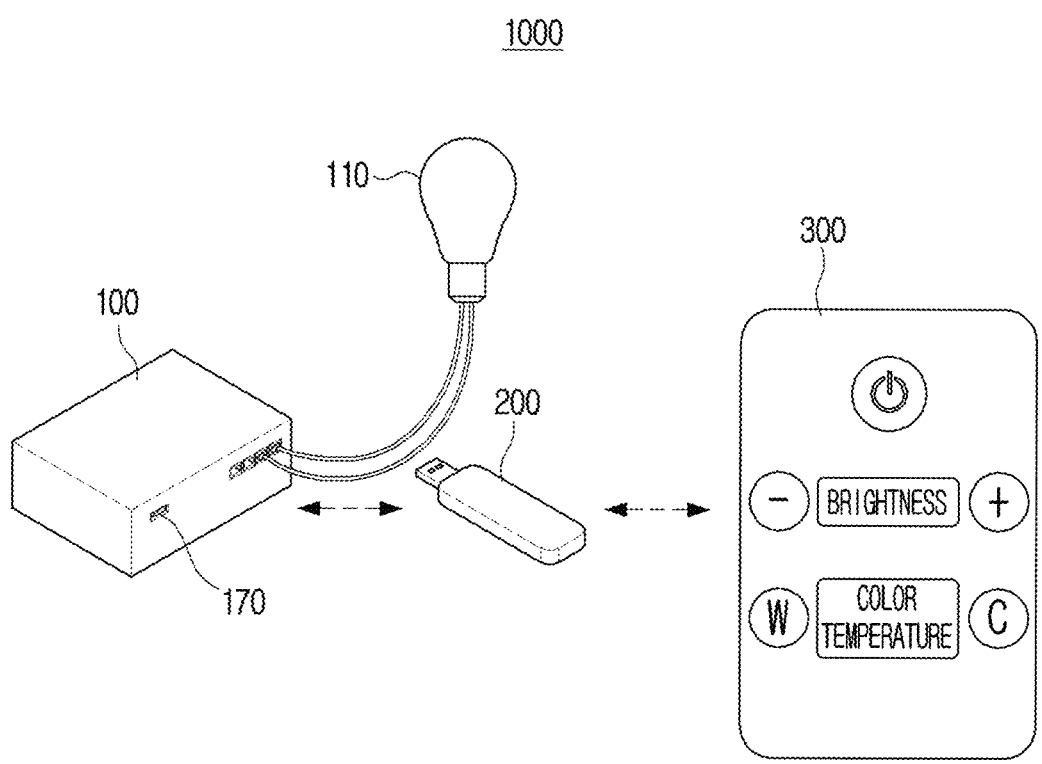
FIG. 1 illustrates a lighting system according to an embodiment.

FIG. 1 illustrates a lighting system according to an embodiment.

Referring to FIG. 1, a lighting system 1000 may include a lighting device 100, a light emitting element 110, an external communication device 200, and a remote control device 300.

The lighting device 100 may refer to a device including a light emitting element. For example, the lighting device 100 may refer to a device including a fluorescent light, a light bulb, a light emitting diode (LED), or the like.

According to an embodiment, the lighting device 100 may refer to a control circuit device that controls a light emitting element. Accordingly, the lighting device 100 may be a device composed of a circuit and an output terminal for controlling the light emitting device without including a light emitting element.

In the description of the disclosure, the lighting device 100 may be replaced by a lighting control circuit device or a control device. When the lighting device 100 is implemented in a form including only a control circuit without including a light emitting element, the lighting device 100 may perform only a role of the control device. Accordingly, the lighting device 100 may refer to a device that is connected to an external light emitting element and only performs a power supply and a control operation.

According to another embodiment, the lighting device 100 may be a device that includes a light emitting element. The lighting device 100 may mean a device including both a light emitting element and a circuit for controlling the light emitting element.

The light emitting element 110 may refer to an element that outputs light. The light emitting element 110 may be implemented as being included in the lighting device 100 or as being separated from the lighting device 100.

The lighting device 100 may include an output terminal 170 and the external communication device 200 may be in contact and connected to the output terminal 170.

The external communication device 200 may refer to a device for receiving user input from the remote control device 300. The external communication device 200 may receive user input from the remote control device 300 and transmit the user input to the lighting device 100. The external communication device 200 and the remote control device 300 may exchange information through various communication methods.

For example, the external communication device 200 may include only one communication module. As another example, the external communication device 200 may include all of a plurality of communication modules. If only one communication module is included in the external communication device 200, the external communication device 200 communicating with the lighting device 100 may be replaced according to the communication method. The related description will be given below in FIG. 12.

The external communication device 200 may communicate with other external devices using various types of communication methods. The external communication device 200 includes at least one of a Wi-Fi module, a Bluetooth module, an infrared communication module, a wireless communication module, or the like. Each communication module may be implemented as or include at least one hardware chip.

The Wi-Fi module and the Bluetooth module may perform communication using a Wi-Fi method and a Bluetooth method, respectively. When using the Wi-Fi module or the Bluetooth module, various connection information such as a service set identifier (SSID) and a session key may be transmitted and received first, and communication information may be transmitted after communication connection.

The infrared ray communication module may perform communication according to infrared data association (IrDA) technology that transmits data wireless to a local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods as described above.

The external communication device 200 may include at least one of a local area network (LAN) module, Ethernet module, or wired communication module performing communication using a pair cable, a coaxial cable, an optical cable, an ultra wide-band (UWB), or the like.

According to another example, the external communication device 200 may use a different communication module (for example, a Wi-Fi module) to communicate with an external server and an external device such as a remote controller.

According to another example, the external communication device 200 may use a different communication module (for example, a Wi-Fi module) to communicate with an external server and an external device such as a remote controller. For example, the external communication device 200 may use at least one of an Ethernet module or a Wi-Fi module to communicate with the external server, and may use a Bluetooth (BT) module to communicate with an external device such as a remote controller. However, this is only an example and the external communication device 200 may use at least one communication module among various communication modules when communicating with a plurality of external devices or external server.

The remote control device 300 may receive a user input and transmit the user input to the external communication device 200. The remote control device 300 may have a decided communication method. For example, the remote control device 300 may transmit information to the external communication device 200 by infrared, Bluetooth, or Wi-Fi communication methods.

The external communication device 200 may be recited as a communication device 200.

Figure 2:
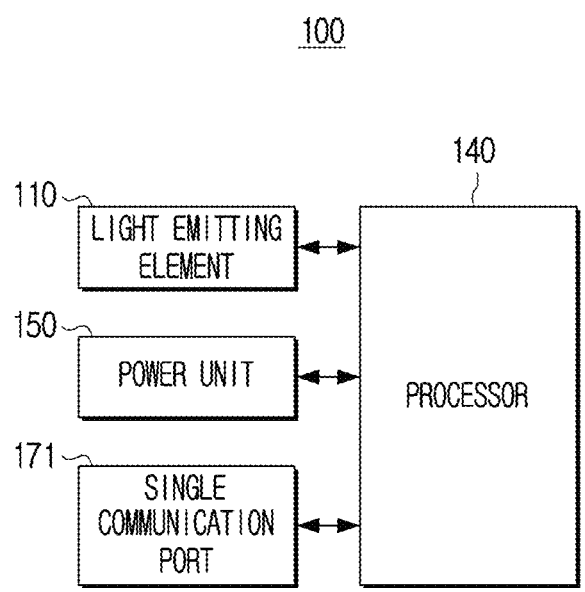
FIG. 2 is a block diagram illustrating a lighting device according to an embodiment.

FIG. 2 is a block diagram illustrating a lighting device according to an embodiment.

Referring to FIG. 2, the lighting device 100 may include the light emitting element 110, the processor 140, a power unit 150, and a single communication port 171.

The light emitting element 110 may refer to an element that outputs light.

The power unit 150 may supply power to the processor 140 and the light emitting element 110. Here, the power unit 150 may supply power so that the power of the light emitting element 110 is turned on. The power unit 150 may supply power with an output current or an output voltage.

The single communication port 171 may refer to a port for exchanging information to communicate with the external communication device 200.

The processor 140 may perform the overall control operation of the lighting device 100. Specifically, the processor 140 may function to control the overall operation of the lighting device 100.

The processor 140 may be implemented with at least one of a digital signal processor (DSP), a microprocessor, and a time controller (TCON). The embodiment is not limited thereto, and the processor 140 may include at least one of a central processing unit (CPU), a micro controller unit (MCU), a micro processing unit (MPU), a controller, an application processor (AP), a graphics-processing unit (GPU), a communication processor (CP), and an advanced reduced instruction set computing (RISC) machine (ARM) processor or may be defined as a corresponding term. The processor 140 may be implemented in a system on chip (SoC) type or a large scale integration (LSI) type in which a processing algorithm is built therein or in a field programmable gate array (FPGA) type. The processor 140 may perform various functions by executing computer executable instructions stored in a memory.

When a user input signal for adjusting the brightness of the light emitting element 110 is received from the external communication device 200 connected to the single communication port 171, the processor 140 may generate a control signal corresponding to the received user input signal and may control the power unit 150 to adjust the brightness of the light emitting element 110 based on the control signal, and the single communication port 171 may be connected to the processor 140 through a single communication line.

The lighting device 100 may further include an auxiliary power unit 160 (see FIG. 3) for supplying auxiliary power, and a single power port 172 (see FIG. 3), and the processor 140 may control the auxiliary power unit 160 to supply auxiliary power to the external communication device 200 connected to the single power port 172, and the single power port 172 may be connected to the auxiliary power unit 160 by a single power line.

The lighting device 100 may further include the output terminal 170 (see FIG. 3), the output terminal 170 may include the single communication port 171 (see FIG. 3) and the single power port 172, and the processor 140 may communicate with the external communication device 200 via the output terminal 170 and supply power to the external communication device 200.

The processor 140 may connect to the external communication device 200 through the output terminal 170. Here, the output terminal 170 may be physically connected to the external communication device 200. According to an implementation example, the single communication port 171 and the single power port 172 may be implemented as a single port, and the output terminal 170 implemented with one port may be a universal serial bus (USB) port.

The external communication device 200 may receive a user input for adjusting the brightness of the light emitting element 110. The external communication device 200 may perform signal processing (or conversion) for the received user input based on a protocol recognizable by the lighting device 100. The external communication device 200 may obtain a processed (or converted) user input signal. The external communication device 200 may transmit the obtained user input signal to the lighting device 100.

The lighting device 100 and the external communication device 200 may be connected via a single communication port 171. Since the lighting device 100 receives a user input signal that has been already processed by the external communication device 200, the single communication port 171 may be configured as a single communication line. To be specific, the processor 140 and the single communication port 171 may be connected via a single communication line. Here, a single communication line may mean one line including a receiving line (RX)/transmitting line (TX).

According to an implementation example, the processor 140 may receive a user input signal from the external communication device 200 through the communication interface 130 of the lighting device 100.

The lighting device 100 may receive a user input signal based on the single communication port 171 and may not necessarily perform a separate signal processing operation, because a signal processing operation may be directly performed by the external communication device 200.

The external communication device 200 may not include a separate self-powered portion. Accordingly, the external communication device 200 may need power supplied from the outside. The lighting device 100 may supply power to the external communication device 200 using the auxiliary power unit 160. The lighting device 100 and the external communication device 200 may be connected through the single power port 172 of the lighting device 100. The processor 140 may provide auxiliary power to the external communication device 200 connected to the single power port 172. The external communication device 200 does not need to generate power by itself, as the external communication device 200 may receive power from the lighting device 100.

The processor 140 may also receive a user input signal from the external communication device 200. The processor 140 may generate a control signal corresponding to the received user input signal. The user input signal is a signal that has been already converted based on a pre-decided protocol from the external communication device 200 and thus, the lighting device 100 may analyze the user input signal. The processor 140 may analyze the user input signal and generate a control signal. The processor 140 may transmit the generated control signal to the power unit 150. Here, the user input signal may include a command to adjust the brightness of the light emitting element 110. Accordingly, the processor 140 may generate a control signal for adjusting the power of the power unit 150 to adjust the brightness of the light emitting element 110, and transmit the control signal to the power unit 150. The power unit 150 receiving the control signal may supply appropriate power to the light emitting element 110 based on the control signal.

Here, if the user input signal is to adjust the brightness of the light emitting element 110, information for adjusting the brightness of the light emitting element 110 may be included in the generated control signal. Specifically, the magnitude of the power source (e.g., the output current) should be adjusted to control the brightness of the light emitting element 110. In order to adjust the brightness of the light emitting element 110, the processor 140 may transmit a control signal including a command to change the output power based on the user input signal to the power unit 150.

The received user input signal may be processed by the external communication device 200 based on a predetermined communication protocol, and the processor 140 may identify whether the received user input signal has been processed based on the pre-decided protocol (or the pre-determined), and if the received user input signal is not processed based on the pre-decided protocol, then may process the received user input signal based on the pre-decided protocol.

The pre-decided protocol may mean a communication protocol recognizable by the lighting device 100. The user input signal may be received by various communication schemes (e.g., infrared, Bluetooth, Wi-Fi, etc.), but the lighting device 100 may not include all of the communication modules, and thus may not receive a previous user input signal. Accordingly, the lighting device 100 may receive a user input signal through the external communication device 200.

If the user input signal is not converted based on the pre-decided protocol, the processor 140 may not interpret all of the user input signals received through various communication methods. Accordingly, the user input signal needs to be converted to a pre-decided protocol or based on a pre-decided protocol. If the user input signal is converted based on the pre-decided protocol, the processor 140 may analyze the user input signal and generate a control signal to perform an operation corresponding to the user input signal, regardless of whether the user input signal has been received by which communication method.

According to an embodiment, the operation in which the user input signal is converted based on the pre-decided protocol may be performed by the external communication device 200. However, preliminarily, the processor 140 may additionally perform an operation of determining whether to process the signal. The detailed description will be described below with reference to FIGS. 8 and 9.

The processor 140 may generate a conversion request signal for converting the received user input signal if the received user input signal is not processed based on the pre-decided protocol, may transmit the generated conversion request signal to the external communication device 200, and may receive the converted user input signal from the external communication device 200.

If the user input signal received from the external communication device 200 is not processed based on the pre-decided protocol, the processor 140 may not interpret the user input signal. Therefore, the processor 140 needs to convert the user input signal based on the pre-decided protocol. For conversion, the processor 140 may transmit a conversion request signal to an external device. The external device may be the external communication device 200 or an external server (not shown).

The processor 140 may generate a conversion request signal (control signal) for converting the user input signal based on the pre-decided protocol. The processor 140 may transmit the generated conversion request signal to the external communication device 200. Here, the conversion request signal may include information related to a user input signal and information related to a pre-decided protocol.

The external communication device 200 may identify whether to convert the user input signal based on the received conversion request signal. If it is identified by the external communication device 200 that the conversion is impossible, the external communication device 200 may transmit a conversion request signal to an external server.

The external server may store information about the pre-decided protocol and may convert the user input signal based on the received conversion request signal. The external server may transmit the converted user input signal to the external communication device 200. The external communication device 200 may transmit the converted user input signal to the lighting device 100.

An additional description will be given below with reference to FIG. 9.

The processor 140 may receive a user input signal through a single communication line, generate an adjustment result signal when the brightness of the light emitting element 110 is adjusted based on the user input signal, and transmit the adjustment result signal to the external communication device 200 through a single communication line.

The external communication device 200 may be connected to the lighting device 100 through the single communication port 171, and the single communication port 171 may be connected to the processor 140 via a single communication line. The processor 140 may receive a user input signal from the external communication device 200 via a single communication port 171 and a single communication line. After performing an operation corresponding to the user input signal, the processor 140 may generate an adjustment result signal including information on the result. The adjustment result signal may include whether the brightness of the light emitting element 110 has changed in response to the user input signal and the changed brightness information. The processor 140 may transmit the generated adjustment result signal to the external communication device 200 through a single communication line and a single communication port 171.

A specific description of the embodiment of transmitting the adjustment result signal will be described below with reference to FIGS. 10 and 11.

The processor 140 may receive communication method information corresponding to the user input signal from the external communication device 200, identify a communication protocol corresponding to the communication method information, convert the adjustment result signal based on the identified communication protocol, and transmit the converted adjustment result signal to the external communication device 200 through a single communication line.

The communication method information may be information indicating whether the user input signal has been received by the external communication device 200 through which communication method. For example, the communication method may be infrared, Bluetooth, or Wi-Fi.

The communication protocol corresponding to each communication method may be different. The processor 140 may receive the converted user input signal based on a communication protocol corresponding to each communication method from the external communication device 200. Accordingly, even when transmitting an adjustment result signal, there is a need to convert the signal based on a communication protocol corresponding to each communication method.

As an example, the conversion operation of the adjustment result signal may be performed by the lighting device 100. The processor 140 may directly convert the adjustment result signal based on a communication protocol corresponding to the user input signal. The processor 140 may transmit the converted adjustment result signal to the external communication device 200.

The external communication device 200 may transmit the converted adjustment result signal to the remote control device 300. The additional description will be described below with reference to FIG. 10.

According to an implementation example, if the lighting device 100 includes a communication module, the processor 140 may transmit the converted adjustment result signal directly to the remote control device 300 without passing through the external communication device 200. This description will be described below with reference to FIG. 11.

As another example, the conversion operation of the adjustment result signal may be performed by the external communication device 200. The processor 140 may transmit the adjustment result signal to the external communication device 200, and the external communication device 200 may convert the received adjustment result signal based on a communication protocol corresponding to the user input signal. The external communication device 200 may transmit the converted adjustment result signal to the remote control device 300.

The lighting device 100 may be linked to various modules using standard power or a lighting equipment. The lighting device 100 may minimize data errors by a bi-directional communication method. The lighting device 100 may transmit state information of a product to an external device (e.g., a user terminal device). The lighting device 100 may save power consumption by setting a standby mode (or standby state). The lighting device 100 may also identify product failure and real-time power usage and may transmit the identified value to an external device. The lighting device 100 may control brightness and color temperature. The lighting device 100 may share a signal for a programmable product.

The lighting device 100 may be implemented with a communication method of a universal asynchronous receiver/transmitter (Uart) or inter-integrated circuit (I2C).

The lighting device 100 may be implemented with a method of individually using communication lines of RX and TX respectively or a method of using RX and TX by one communication line.

The lighting device 100 may perform a lighting control function and an additional function under normal operating conditions through a connector connection structure such as a USB. The additional function may be performed by a specific mode, and the specific mode may refer to a programmable mode. The programmable mode may perform a power information input function when generating power, a product setting function such as output current, capacity, etc. when a lighting product is produced, an additional information input function, and an inputted information confirmation function (production information association, usage information collection).

The lighting device 100 may also store and periodically update the software information. The lighting device 100 may also perform a function test of the product itself and may be associated with a test equipment.

The lighting device 100 may perform a function to control a brightness signal basically, and may perform power on/off, color temperature control, communication error identification, error monitoring, power detection, composite power connection implementation, or the like.

The lighting device 100 may transmit information on an external environment to an external device using pre-determined communication protocol when controlling network and composite module signal.

The lighting device 100 may set the information of the product through a connection with the PC when configuring the programmable power supply. The lighting device 100 may insert software information into the processor 140 and perform an update.

The lighting device 100 may also utilize a DALI/DMX/RS485/WiFi/BLE/Zigbee association module with a standard power source based on a product to which the lighting programmable power source and the IoT module are applied. The lighting device 100 may be applied to a module in which a smart platform, an AI speaker, a remote control device, a sensor, or the like, are associated in a complex manner.

The lighting device 100 may improve the association of various methods and compatibility problems according thereto. Since a standard power source and various control methods may be connected, cost reduction and product configuration efficiency may be maximized for power and lighting equipment development.

The lighting device 100 may receive user input from the external communication device 200 through one single communication line. Therefore, compared to an example where various communication modules are disposed inside the lighting device 100, a circuit may be simple and a production cost may be reduced.

Since the lighting device 100 receives a user input signal through the external communication device 200, the lighting device 100 may be replaced with an appropriate external communication device. Accordingly, a user may receive a user input signal of various communication types using one lighting device 100. The user may use the lighting system by replacing only the external communication device 200 without replacing the lighting device 100 if necessary.

Only simple configurations of the lighting device 100 are illustrated, but in implementation, various configurations may be added. This will be described below with reference to FIG. 3.

Figure 3:
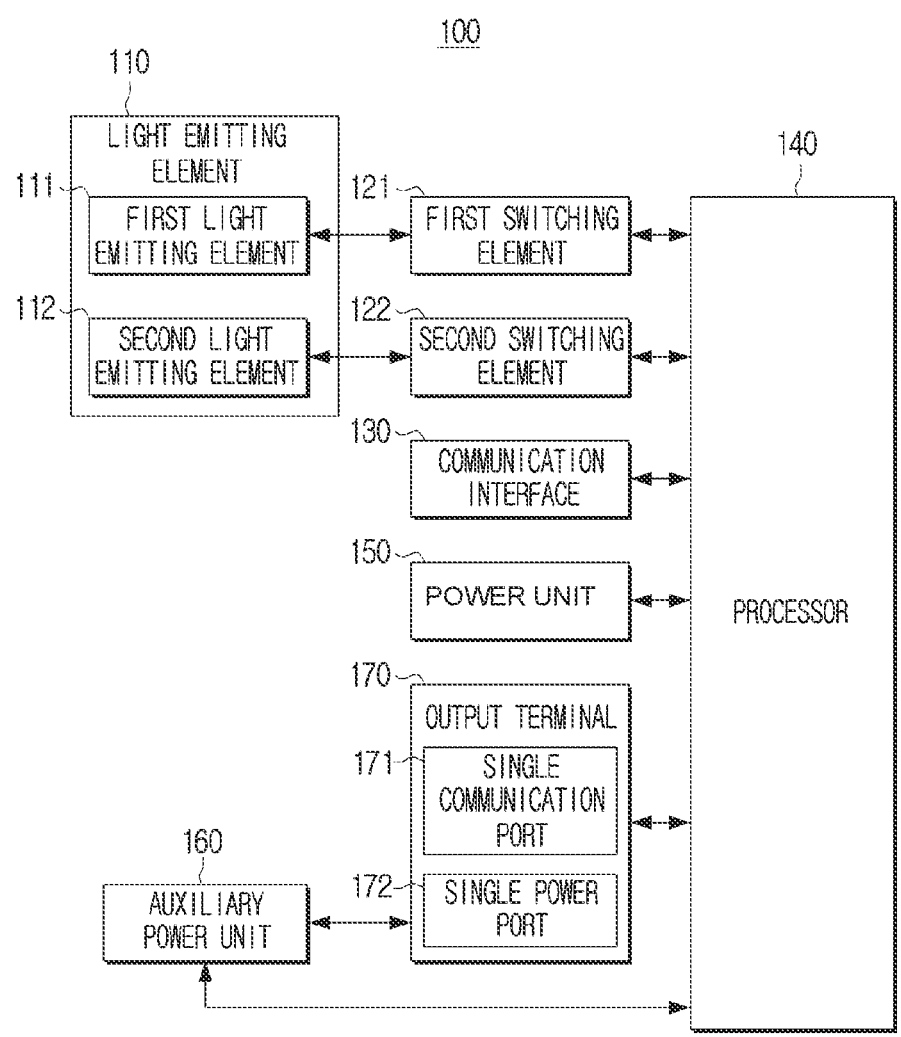
FIG. 3 is a block diagram illustrating a detailed configuration of the lighting device of FIG. 2.

FIG. 3 is a block diagram illustrating a detailed configuration of the lighting device of FIG. 2.

Referring to FIG. 3, the lighting device 100 may include the light emitting element 110, a switching element 121, 122, the communication interface 130, the processor 140, the power unit 150, an auxiliary power unit 160, an output terminal 170, and a memory (not shown).

The operations of the processor 140 and the power unit 150 which are the same as the descriptions above will not be described.

The light emitting element 110 may include a first light emitting element 111 and a second light emitting element 112. The light emitting element 110 may include a plurality of light emitting elements having different color temperatures. For example, the light emitting element 110 may include at least one first light emitting element 111 having a first color temperature and at least one second light emitting element 112 having a second color temperature. Here, the light emitting element 110 may refer to a light emitting element module.

The first light-emitting element 111 may refer to an element that emits a first color temperature. The first light-emitting element 111 may refer to a first light-emitting type element, and the first light-emitting element 111 may refer to an element that emits a warm-type light source. Here, the worm-type light source may refer to a light source having a color temperature of less than 4000K.

The second light-emitting element 112 may refer to an element that emits a second color temperature. Here, the second light-emitting element 112 may refer to a second light-emitting type element, and the second light-emitting element 112 may refer to an element that emits a cold-type light source. The cold-type light source may refer to a light source having a color temperature of 4000K or more.

The first switching element 121 and the second switching element 122 may be implemented as a mechanical switch or an electronic switch. The first switching element 121 and the second switching element 122 may refer to a transistor switch. The first switching element 121 and the second switching element 122 may be arranged to connect the processor 140 and the light emitting element 110.

The communication interface 130 is configured to communicate with various types of external devices according to various types of communication methods. For example, the communication interface 130 may include a Wi-Fi module, a Bluetooth module, an infrared communication module, a wireless communication module, or the like. The Wi-Fi module and the Bluetooth module, respectively, may perform communication in Wi-Fi method, a Bluetooth method, respectively. The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods as described above.

According to an embodiment, the communication interface 130 may include a plurality of communication modules included in the external communication device 200.

The auxiliary power unit 160 may supply power to the processor 140 when the light emitting element 110 is turned off. When the power of the light emitting element 110 is turned off, it should be prepared to receive a user command to turn on the power of the lighting device 100, and the lighting device 100 may need power to perform some functions. The auxiliary power unit 160 may supply auxiliary power to the communication interface 130 or the processor 140 in a state where the power of the light emitting element 110 is turned off and the power supply of the power unit 150 is blocked.

The output terminal 170 may include at least one output terminal. The output terminal 170 may include the single communication port 171 and the single power port 172. The single communication port 171 may refer to a port for transmitting and receiving information to communicate with the external communication device 200. The single power port 172 may refer to a port for supplying power to the external communication device 200.

The output terminal 170 may include at least one of a light emitting diode (LED) anode (a positive electrode) output terminal, LED cathode (a negative electrode) output terminal, a first color temperature output terminal, or a second color temperature output terminal.

The memory (not shown) may be implemented as an internal memory such as a read-only memory (ROM), such as electrically erasable programmable read-only memory (EEPROM), and a random-access memory (RAM) or a memory separate from the processor 140. In this case, the memory (not shown) may be implemented as at least one of a memory embedded within the lighting device 100 or a memory detachable from the lighting device 100 according to the usage of data storage. For example, the data for driving the lighting device 100 may be stored in the memory embedded within the lighting device 100, and the data for upscaling of the lighting device 100 may be stored in the memory detachable from the lighting device 100.

Figure 4:
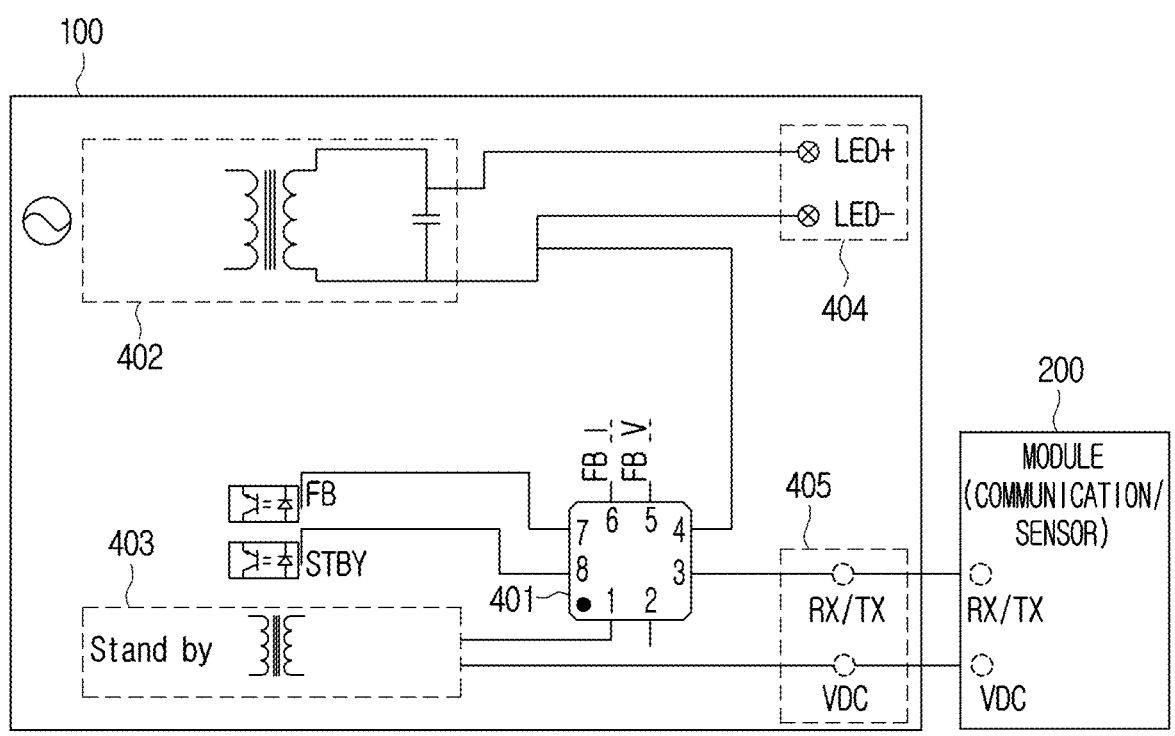
FIG. 4 illustrates a circuit diagram illustrating the lighting device according to an embodiment.

FIG. 4 illustrates a circuit diagram illustrating the lighting device according to an embodiment.

Referring to FIG. 4, the lighting device 100 may include a processor 401, a power unit 402, an auxiliary power unit 403, a first output terminal 404, and a second output terminal 405. The lighting device 100 may be connected to the external communication device 200 through the second output terminal 405.

The processor 401 may correspond to the processor 140 shown in FIG. 2, the power unit 402 may correspond to the power unit 150 shown in FIG. 2, the auxiliary power unit 403 may correspond to the auxiliary power unit 160 shown in FIG. 3, and the first output terminal 404 and the second output terminal 405 may correspond to the output terminal 170 shown in FIG. 3.

The processor 401 may be connected to the power unit 402, the auxiliary power unit 403, a first output terminal 404, and a second output terminal 405.

The processor 401 may transmit a control signal to the power unit 402 so that the power unit 402 supplies power to the light emitting element through the first output terminal 404.

The processor 401 may supply a control signal to the auxiliary power unit 403 so that the auxiliary power unit 403 supplies power to the external communication device 200 through the second output terminal 405.

The first output terminal 404 may include an LED anode output terminal and an LED cathode output terminal. The LED anode output terminal and the LED cathode output terminal may be connected to the light emitting element.

The second output terminal 405 may include the single communication port 171 and the single power port 172. The single communication port 171 may mean one port implemented with an RX/TX (receiving port/transmitting port). The single power port 172 may refer to a port that transmits power from the auxiliary power unit 403 to the external communication device 200. The power source is a standby power source and may refer to a direct current (DC) power source.

Figure 5:
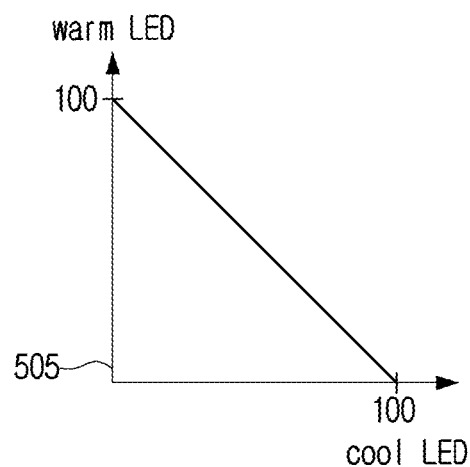
FIG. 5 illustrates a relation between the first light emitting element and the second light emitting element.

FIG. 5 illustrates a relation between the first light emitting element and the second light emitting element.

Referring to FIG. 5, according to an embodiment, the brightness of the lighting device 100 may be adjusted from 0 to 100. Here, since the maximum value of the brightness is different according to the types of the lighting device, the maximum value may be a relative value. For example, the brightness value may be adjusted from 0% to 100%.

According to another embodiment, the lighting device 100 may include a plurality of light emitting devices, not one light emitting device. The lighting device 100 may include a first light emitting element 111 and a second light emitting element 112. The first light-emitting element 111 may refer to a first type of light-emitting element having a first color temperature, the first color temperature may refer to a warm tone, and may refer to a color between a Kelvin value of 2500K to 3500K. The second color temperature may mean a cold tone and may refer to a color of a Kelvin value between 5500K and 6500K. The first light emitting element 111 and the second light emitting element 112 may output brightness from 0 to 100, respectively.

Referring to a graph 505, the first light emitting element 111 and the second light emitting element 112 may individually determine the brightness of each light emitting element based on the ratio information between the brightness of the first light emitting element 111 and the brightness of the second light emitting element 112. Specifically, the lighting device 100 may control a sum of the brightness of the first light emitting element 111 and the brightness of the second light emitting element 112 to be constant. For example, when the brightness of the first light emitting element 111 is maximum, the lighting device 100 may adjust the brightness of the second light emitting element 112 at a minimum. When the brightness of the first light emitting element 111 is minimized, the lighting device 100 may adjust the brightness of the second light emitting element 112 to maximum. Therefore, when the brightness of the first light emitting element 111 is adjusted, the lighting device 100 may adjust the brightness of the second light emitting element 112.

FIG. 6 illustrates various embodiments in which a first light emitting element, a second light emitting element, and a light emitting control module are connected.

Referring to an embodiment 600 of FIG. 6, the lighting device 100 may include an LED control gear 601 and a light emitting element module 606.

The LED control gear 601 may refer to a main board for controlling the light emitting element module 606. The LED control gear 601 may include switching elements 121 and 122, the communication interface 130, the processor 140, the power unit 150, the auxiliary power unit 160, and the output terminal 170. The output terminal 170 may include an LED anode output terminal 602, an LED cathode output terminal 603, a first color temperature output terminal 604, and a second color temperature output terminal 605.

The light emitting element module 606 may include a first light emitting element 607 having a first color temperature and a second light emitting element 608 having a second color temperature. The LED anode output terminal 602 may be connected to the of the first light emitting element 607 and the anode (a positive electrode) of the second light emitting element 608. The LED cathode output terminal 603 may not be connected to a separate light emitting element. The LED cathode output terminal 603 may be used when a general lighting that does not adjust the color temperature is connected. The relevant description will be described in another embodiment 620 below. The first color temperature output terminal 604 may be connected to a cathode (a negative electrode) of the first light emitting element 607. The second color temperature output terminal 605 may be connected to the cathode (a negative electrode) of the second light emitting element 608.

Referring to another embodiment 610, the lighting device 100 may include an LED control gear 611 and a light emitting element module 615 in the same manner as the embodiment 600.

The LED light control gear 611 may refer to a main board for controlling the light emitting element module 615. The LED control gear 611 may include switching elements 121 and 122, the communication interface 130, the processor 140, the power unit 150, the auxiliary power unit 160, and the output terminal 170. The output terminal 170 may include an LED anode output terminal 612, a first color temperature output terminal 613, and a second color temperature output terminal 614.

The light emitting element module 615 may include a first light emitting element 616 having a first color temperature and a second light emitting element 617 having a second color temperature. The LED anode output terminal 612 may be connected to the anode (a positive electrode) of the first light emitting element 616 and the anode of the second light emitting element 617. The first color temperature output terminal 613 may be connected to a cathode of the first light emitting element 616. The second color temperature output terminal 614 may be connected to the cathode of the second light emitting element 617.

Since the LED control gear 611 according to another embodiment 610 does not include the LED cathode output terminal 603, the LED control gear 611 may be used only for emotional lighting. The LED control gear 601, which may be commonly used for general lighting and emotional lighting, is advantageous in that user convenience is high and the LED control gear 611, which may be used exclusively for emotional lighting, has an advantage that a failure rate and a product production cost are low.

Using one standardized LED control gear, general lighting and emotional lighting may be controlled. The LED control gear may be used in products of various brightness by using the current varying function inside the LED control gear.

The LED control gear may be configured as a semiconductor component and may be implemented in a structure in which a voltage or current may be fed back. The LED control gear may supply an output current (a fixed output current or a variable current using a software/external resistance, etc.) that is set based on the brightness signal received from the outside to the light emitting element. The LED control gear may determine the color temperature by adjusting the ratio of the output current based on the switching element. Here, when the total sum of the output currents is 100%, the LED control gear may distribute current to each of the light emitting elements.

According to an embodiment, the LED light control gear 601 according to the embodiment 600 may be used in both general lighting (lighting including a light emitting element having one color temperature) and sentimental lighting (lighting including a plurality of light emitting elements having different color temperatures).

According to another embodiment 620, the lighting device 100 may include the Led control gear 601 and the light emitting element module 626.

The light emitting element module 626 may include general lighting. The general lighting may refer to lighting having a color temperature. The lighting device 100 may control a light emitting element module 626 including a light emitting element having a color temperature in addition to the light emitting element module 606 including a plurality of light emitting elements having different color temperatures using the same LED light control gear 601 as the embodiment 600.

The light emitting element module 626 may include only a first light emitting element 627 having a first color temperature. The LED anode output terminal 602 may be connected to the anode of the first light emitting element 627, and the LED cathode output terminal 603 may be connected to the cathode of the first light emitting element 627.

Based on the embodiment 600 and another embodiment 620, the lighting device 100 may be equally applicable to a light emitting element module capable of expressing a plurality of color temperatures as well as a light emitting element module capable of expressing a plurality of color temperatures using the same LED light control gear 601.

Accordingly, the lighting device 100 may be used in various light emitting element modules, and thus may have high compatibility.

The lighting device 100 may control a plurality of light emitting elements having different color temperatures based on ratio information.

The light emitting element 110 may include the first light emitting element 111 having the first color temperature and include the second light emitting element 112 having the second color temperature, the processor 140 may identify the total supply current of the lighting device 100, identify ratio information between the brightness of the first light emitting element 111 and the brightness of the second light emitting element 112 based on the user input, and supply the identified total supply current to the first light emitting element 111 and the second light emitting element 112 based on the identified ratio information.

The lighting device 100 may further include the first switching element 121 and the second switching element 122, the processor 140 may identify first current supplied to the first light emitting element 111 and second current supplied to the second light emitting element 112 based on the total supply current and ratio information, supply the first current to the first light emitting element 111 by controlling the first switching element 121, and may supply second current to the second light emitting element 112 by controlling the second switching element 122.

The processor 140, based on receiving the first user input (first user input signal) for adjusting the brightness of the lighting device 100 from the external communication device 200, may adjust brightness of the first light emitting element 111 and the second light emitting element 112 based on the first user input, and based on receiving the second user input (second user input signal) for adjusting the color temperature from the external communication device 200, may obtain ratio information between the brightness of the first light emitting element 111 and the brightness of the second light emitting element 112 based on the second user input, and may adjust all the brightness of the first light emitting element 111 and the second light emitting element 112 based on the obtained ratio information.

Based on receiving the first user input for increasing the brightness of the lighting device 100, the processor 140 may control the brightness of the first light emitting element 111 and the second light emitting element 112 to increase the brightness of the first light emitting element 111 and the brightness of the second light emitting element 112.

Based on receiving the second user input to reduce the color temperature, the processor 140 may control the brightness of the first light emitting element 111 and the second light emitting element 112 to increase the brightness of the first light emitting element 111 and reduce the brightness of the second light emitting element 112.

The first light emitting element 111 may refer to an element emitting a light source of a warm type, and the second light emitting element 112 may refer to an element emitting a light source of a cold type.

The first user input may be a control command to adjust the overall brightness of the lighting device 100. The second user input may also be a control command to adjust the color temperature of the lighting device 100. The user input for adjusting the color temperature may be a control command to select whether the entire color temperature of the lighting device 100 is controlled to emit light in a warm type or in a cold type.

Based on receiving the second user input to change the color temperature, the processor 140 may adjust the brightness of the first light emitting element 111 and the brightness of the second light emitting element 112 to adjust the overall color temperature. For example, based on receiving a user input for adjusting the entire color temperature to the warm type, the processor 140 may increase the brightness of the first light emitting element 111 and reduce the brightness of the second light emitting element 112. Based on receiving a user input for adjusting the entire color temperature to the cold type, the processor 140 may reduce the brightness of the first light emitting element 111 and increase the brightness of the second light emitting element 112.

The processor 140 may receive at least one of the first user input or the second user input through the external communication device 200.

According to an embodiment, the first user input and the second user input may be received together. The processor 140 may control the light emitting element by considering both the first user input and the second user input.

However, in accordance with an implementation example, only one user input of the first user input or the second user input may be received. That is, only one control command of brightness or color temperature may be included in the user input. The processor 140 may control the light emitting element with a numeral value that has recently been provided for an item that is not received. For example, if only the user input to the color temperature is received, the processor 140 may adjust the color temperature corresponding to the user input and the overall brightness may maintain the recently provided brightness.

The brightness may be replaced with a word such as an illuminance, dimming, or the like.

The processor 140 may obtain a brightness value corresponding to the first user input and adjust the brightness of the first light emitting element 111 and the brightness of the second light emitting element 112 based on the obtained brightness. The adjustment may be replaced by a word, such as change, conversion, control, or the like. The brightness corresponding to the first user input may mean the brightness of the entire lighting device 100.

The processor 140 may obtain brightness ratio information between the first light emitting element 111 and the second light emitting element 112 based on the second user input. The second user input may be a command to adjust color temperature and may be a command to determine which light source of the warm type light source and the cold type light source will emit light more. The brightness ratio information may mean a ratio between the brightness of the light source output from the first light emitting element 111 and the brightness of the light source output from the second light emitting element 112. For example, assuming that the maximum output of the first light emitting element 111 and the second light emitting element 112 is equal to 100, and if the output of the first light emitting element 111 is 10 and the output of the second light emitting element 112 is 40, the ratio information may be 1:4.

The processor 140 may identify the brightness of the first light emitting element 111 and the brightness of the second light emitting element 112 based on the brightness ratio information and total brightness corresponding to the first user input. The processor 140 may supply power to each light emitting element to emit light with the identified brightness of the first light emitting element 111 and the brightness of the second light emitting element 112.

The processor 140 may identify the total supply current corresponding to the brightness of the lighting device 100 based on the first user input, and supply the total supply current identified based on the obtained ratio information to the first light emitting element 111 and the second light emitting element 112.

The processor 140 may obtain a total supply current corresponding to the obtained brightness. The processor 140 may distribute the current to the first light emitting element 111 and the second light emitting element 112 based on the total supply current obtained by the processor 140. As the total supply current increases, the total brightness of the lighting device 100 may be increased. Thus, depending on the overall brightness corresponding to the first user input, the processor 140 may determine the overall supply current.

For example, the total supplied current may be 100 and the ratio information (brightness of the first light emitting element 111: brightness of the second light emitting element 112) may be 1:4. The processor 140 may supply 20 to the first light emitting element 111 and supply 80 to the second light emitting element 112.

The processor 140 may identify a first current supplied to the first light emitting element 111, a second current supplied to the second light emitting element 112 based on the total supply current and ratio information, identify whether at least one of the total supply current, the first current, or the second current is within a threshold range, and based on identification that at least one of the total supply current, the first current, or the second current is identified as being out of a threshold range, the processor 140 may identify that the lighting device 100 has a failure.

The processor 140 may determine or measure the current supplied to each of the first light emitting element 111 and the second light emitting element 112. The processor 140 may obtain the total supply current, the first current (the current supplied to the first light emitting element 111), and the second current (the current supplied to the second light emitting element 112). The processor 140 may determine whether the current is in a normal range. If the current is not in the normal range, the processor 140 may identify that the lighting device 100 has a failure. If the current is lower than the first threshold or higher than the second threshold, the processor 140 may identify that the lighting device 100 has a problem.

According to an implementation example, the critical range of the total supply current, the first current, and the second current, respectively, may be different. The critical range of determining the normal range may be different based on the element or circuit of supplying current.

The processor 140 may obtain a first control signal corresponding to the first color temperature based on the total supply current and the ratio information, invert a waveform of the identified first control signal to obtain a second control signal corresponding to the second color temperature, transmit the first control signal to the first light emitting element 111, and transmit the second control signal to the second light emitting element 112.

The first control signal corresponding to the first color temperature may include information related to brightness of the first light emitting element 111. The second control signal corresponding to the second color temperature may include information related to brightness of the second light emitting element 112.

The processor 140 may obtain a waveform of the obtained first control signal and invert the obtained waveform to obtain an inverted first control signal. The processor 140 may decide the inverted first control signal as a second control signal. The processor 140 may invert the first control signal based on a pre-decided function to obtain a second control signal. The inversion method may be a method of inverting a Sin waveform in a COS form, and a method of converting a waveform of a signal by using an inverting amplifier.

The lighting device 100 may include a first switching element 121 and a second switching element 122, and the processor 140 may supply a first current to the first light emitting element 111 through the first switching element 121 based on the first control signal, and supply a second current to the second light emitting element 112 through the second switching element 122 based on the second control signal.

Figure 7:
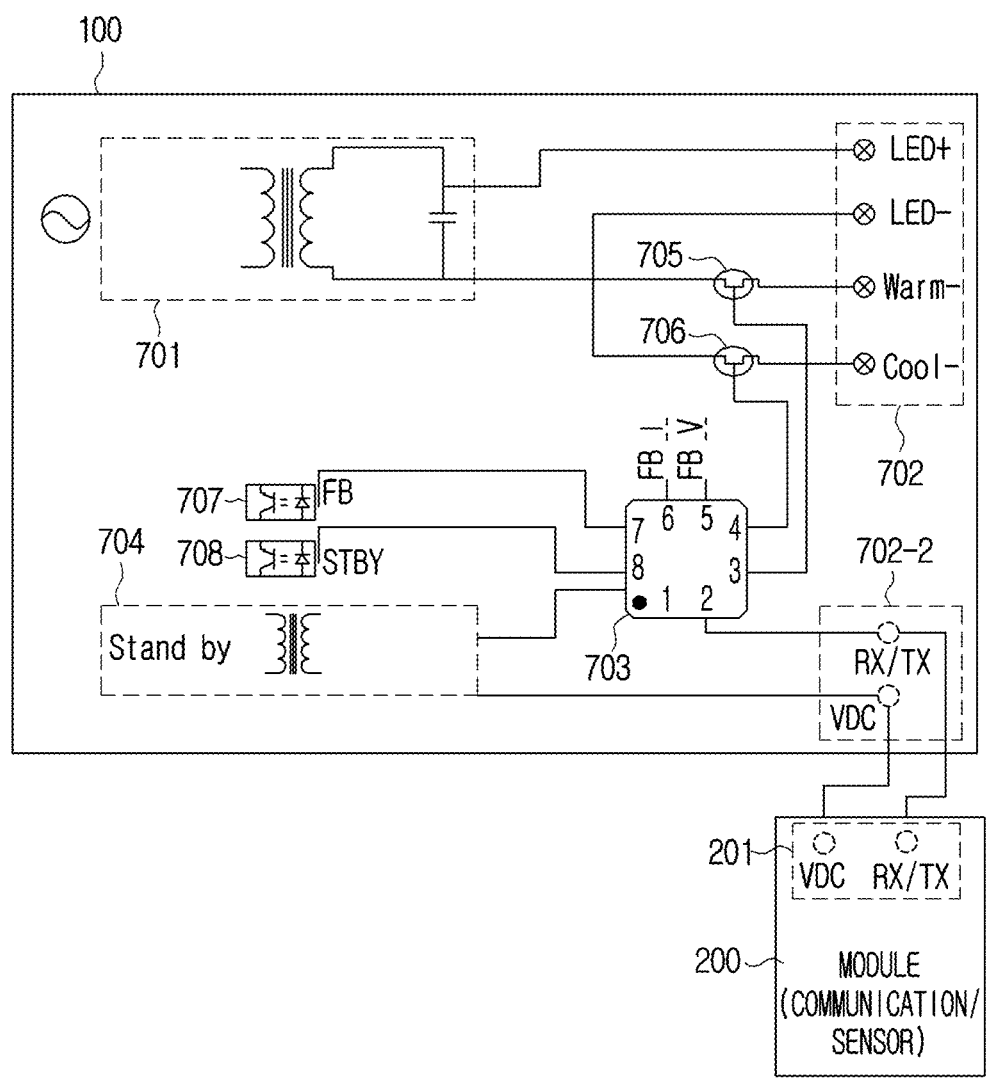
FIG. 7 illustrates a circuit diagram illustrating the lighting device according to another embodiment.

The first switching element 121 may correspond to a first switching element 705 of FIG. 7, and the second switching element 122 may correspond to a second switching element 706 of FIG. 7.

The processor 140 may divide the total output current received from the power unit 150 into a first current and a second current using the first switching element 121 and the second switching element 122. The processor 140 may control the power unit 150 and the respective switching elements 121 and 122 to supply the divided first and second currents to the first light emitting element 111 and the second light emitting element 112, respectively.

The processor 140 may adjust the current supplied to the first light emitting element 111 and the second light emitting element 112 using the first switching element 121 and the second switching element 122.

The lighting device 100 may further include the output terminal 170 including an LED anode output terminal, an LED cathode output terminal, a first color temperature output terminal and a second color temperature output terminal, and the LED anode output terminal may be connected to the anode of the first light emitting element 111 and the anode of the second light emitting element 112, and the first color temperature output terminal may be connected to the cathode of the first light emitting element 111 and the second color temperature output terminal may be connected to the cathode of the second light emitting element 112. The LED cathode output terminal may be connected to the cathode of the first light emitting element when the brightness is controlled by only the first light emitting element without the second light emitting element.

The lighting device 100 may further include a red light emitting diode, a green light emitting diode, and a blue light emitting diode, and the output terminal 170 may further include a red output terminal, a green output terminal, and a blue output terminal, the LED anode output terminal may be connected to an anode of the red light emitting diode, the anode of the green light emitting diode, the red output terminal may be connected to the cathode of the red light emitting diode, the green output terminal may be connected to the cathode of the green light emitting diode, and the blue output terminal may be connected to the cathode of the blue light emitting diode.

Referring to FIG. 6, only the first light emitting element 111 and the second light emitting element 112 are illustrated, but three of the light emitting element (R-LED), green light emitting element (G-LED), and blue light emitting element (B-LED) emitting different colors according to an embodiment may be included in the light emitting element module.

The lighting device 100 may further include the auxiliary power unit 160, and the processor 140, based on the power of the lighting device 100 being turned off, may supply power to the lighting device 100 using the auxiliary power unit 160.

The lighting device 100 may operate in a normal mode and a standby mode (power saving mode). The general mode may refer to a state in which a light source emits light from a light emitting element. The standby mode may refer to a state in which a light source is not emitted from a light emitting element and a minimum power is consumed to receive a power on command.

In the general mode, the processor 140 may transmit the power supplied from the power unit 150 to the light emitting element.

In the standby mode, the processor 140 may block the power supplied from the power unit 150 and may use only the power supplied from the auxiliary power unit 160. In the standby mode, the communication interface 130 or the external communication device 200 may be turned on to receive a user input (e.g., a command to change the power of the lighting device 100 to an on state).

The processor 140 may identify the total color temperature based on a light emitting operation which is output finally.

For example, the processor 140 may identify the brightness of the first light emitting element 111 and the brightness of the second light emitting element 112 to identify the total color temperature and provide the identified total color temperature to the user. The processor 140 may provide the identified total color temperature information to a user terminal device or a separate external device.

As another example, the lighting device 100 may include a camera, and the processor 140 may measure the total color temperature by capturing a vicinity of the lighting device 100 using a camera.

The lighting device 100 may further include a display. The processor 140 may control the display to display the obtained total color temperature or ratio information. Specifically, the processor 140 may display the total color temperature on the display. The processor 140 may display ratio information between the brightness of the first light emitting element 111 and the brightness of the second light emitting element 112 on the display.

FIG. 7 illustrates a circuit diagram illustrating the lighting device according to another embodiment.

Referring to FIG. 7, the lighting device 100 may include a power unit 701, a first output terminal 702, a second output terminal 702-2, a processor 703, an auxiliary power unit 704, a first switching element 705, a second switching element 706, and switches 707 and 708.

The power unit 701, the output terminals 702 and 702-2, the auxiliary power unit 705, the first switching element 705 and the second switching element 706 may correspond to each configuration of FIG. 2.

The first output terminal 702 may include the LED cathode output terminal, the first color temperature output terminal, and the second temperature output terminal.

The second output terminal 702-2 may include the single communication port 171 and the single power port 172. The single communication port 171 may refer to one port implemented with an RX/TX port. The single power port 172 may refer to a port that transmits power from the auxiliary power unit 704 to the external communication device 200. The transmitted power may be a standby power source and may refer to a direct current (DC) power source.

The second output terminal 702-2 may be connected to the external communication device 200. The second output terminal 702-2 may be a universal serial bus (USB) port. The processor 703 may receive and transmit information through the single communication port 171 included in the second output terminal 702-2, and supply the power of the auxiliary power unit 704 to the external communication device 200 through the single power port 172 included in the second output terminal 702-2.

The external communication device 200 may include an output terminal 201 including a communication port and a power port. The external communication device 200 may transmit or receive information to the lighting device 100 through a communication port included in the output terminal 201, and may receive power through a power port included in the output terminal 201.

The power supply 701 may be connected to all the LED anode output terminal, the LED cathode output terminal, the first color temperature output terminal, and the second color temperature output terminal included in the output terminal 702. A first switching element 705 may be disposed between the power supply 701 and the first color temperature output terminal, and a second switching element 706 may be disposed between the power supply 701 and the second color temperature output terminal.

The power unit 701 may be connected to the processor 703. The second switching element 706 may be connected between the power unit 701 and the processor 703. The power unit 701 may supply power to the processor 703 through the second switching element 706.

The auxiliary power unit 704 may be connected to the processor 703. The auxiliary power unit 704 may supply standby power to the processor 703 when the light emitting element is turned off. When the lighting device 100 is turned off, the lighting device 100 may receive only the standby power through the auxiliary power unit 704 in order to maintain a state where the command to power on the lighting device 100 may be received. The state in which the power of the light emitting element is turned off may be a standby mode, and in the standby mode, the power supplied from the power supply 701 may be blocked.

The processor 703 may receive a user input signal including at least one of a brightness adjustment command or a color temperature adjustment command and may control the lighting device 100 to perform an operation corresponding to the received user input signal.

The lighting device 100 may include a switch 707 for supplying or blocking power of the power unit 701 and a switch 708 for supplying or blocking power of the auxiliary power unit 704.

The lighting device 100 may independently control the brightness and color temperature to increase the utilization of the emotional lighting (lighting capable of providing a plurality of color temperatures). The lighting device 100 may be implemented in the form of using only a general lighting (lighting of which color temperature is non-adjustable) or using only emotional lighting, or using general lighting and emotional lighting at the same time. The lighting device 100 may control both the first light emitting element 111 and the second light emitting element 112 based on the user input for one color temperature type.

Figure 8:
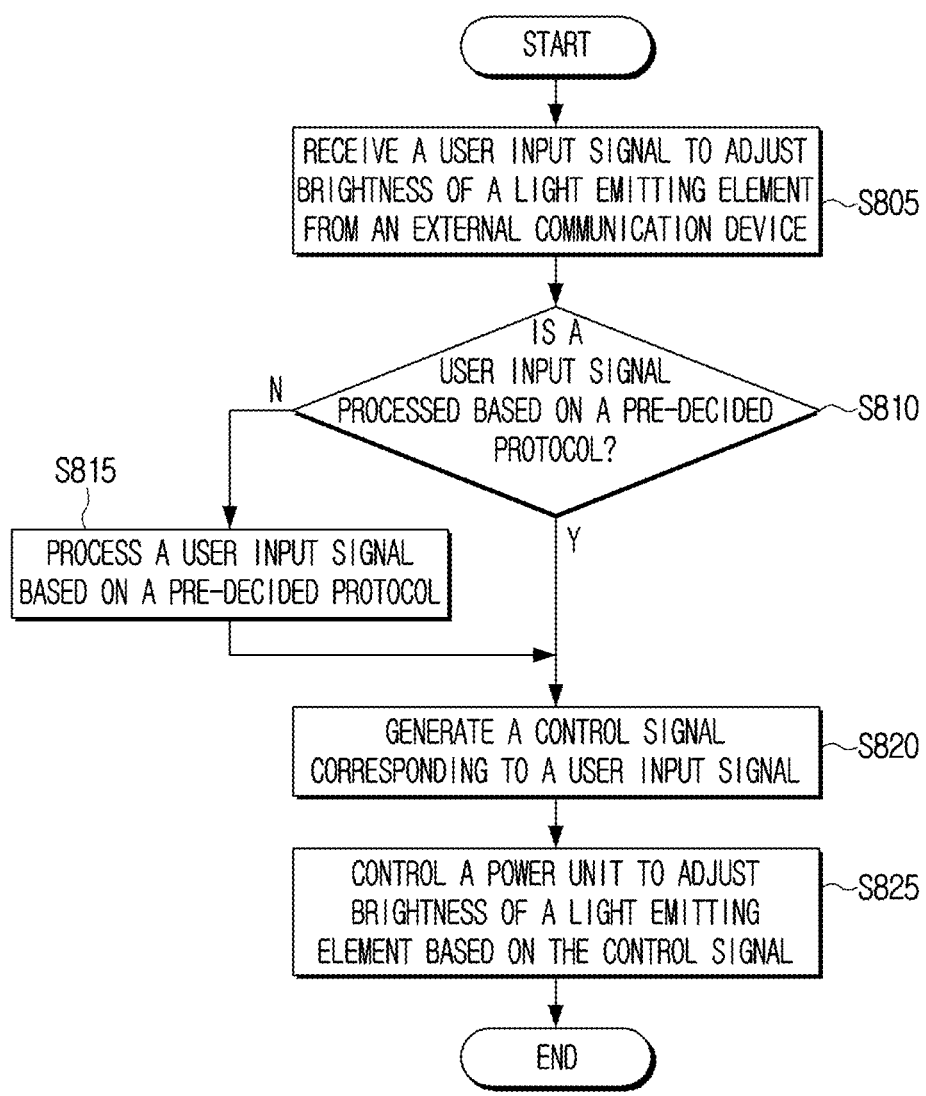
FIG. 8 is a flowchart illustrating a protocol processing operation according to an embodiment.

FIG. 8 is a flowchart illustrating a protocol processing operation according to an embodiment.

Referring to FIG. 8, the lighting device 100 may receive a user input to adjust brightness of the light emitting element 110 from the external communication device 200 in operation S805. The lighting device 100 may identify whether the user input signal is processed based on the pre-decided protocol in operation S810. The pre-decided protocol may be a protocol required for the lighting device 100 to recognize a signal.

According to an embodiment, the user input signal may be processed based on the pre-decided protocol by the external communication device 200. The external communication device 200 may include various communication modules, may receive a user input from the remote control device 300, and may process the user input signal based on the protocol corresponding to the lighting device 100. The external communication device 200 may transmit the processed (or converted) user input signal to the lighting device 100.

According to another embodiment, the user input signal may be processed by the lighting device 100. The lighting device 100 may process a user input signal based on the protocol corresponding to the lighting device 100.

If the received use input signal is not processed based on a pre-decided protocol in operation S810-N, the lighting device 100 may process the user input signal based on the pre-decided protocol in operation S815. The lighting device 100 may store pre-decided protocol in a memory (not shown). The lighting device 100 may store a function to convert various communication signals based on a pre-decided protocol in a memory (not shown). If the received user input signal is not processed based on the pre-decided protocol, the lighting device 100 may not interpret the user input signal and thus, the lighting device 100 may process the received user input signal based on the pre-decided protocol.

When the received user input signal is processed based on the pre-decided protocol in operation S810-Y, the lighting device 100 may generate a control signal corresponding to the user input signal in operation S820.

The lighting device 100 may control the power unit 150 to adjust brightness of the light emitting element 110 based on the generated control signal in operation S825. The lighting device 100 may transmit, to the power unit 150, the control signal to supply power to the light emitting element from the power unit 150.

Figure 9:
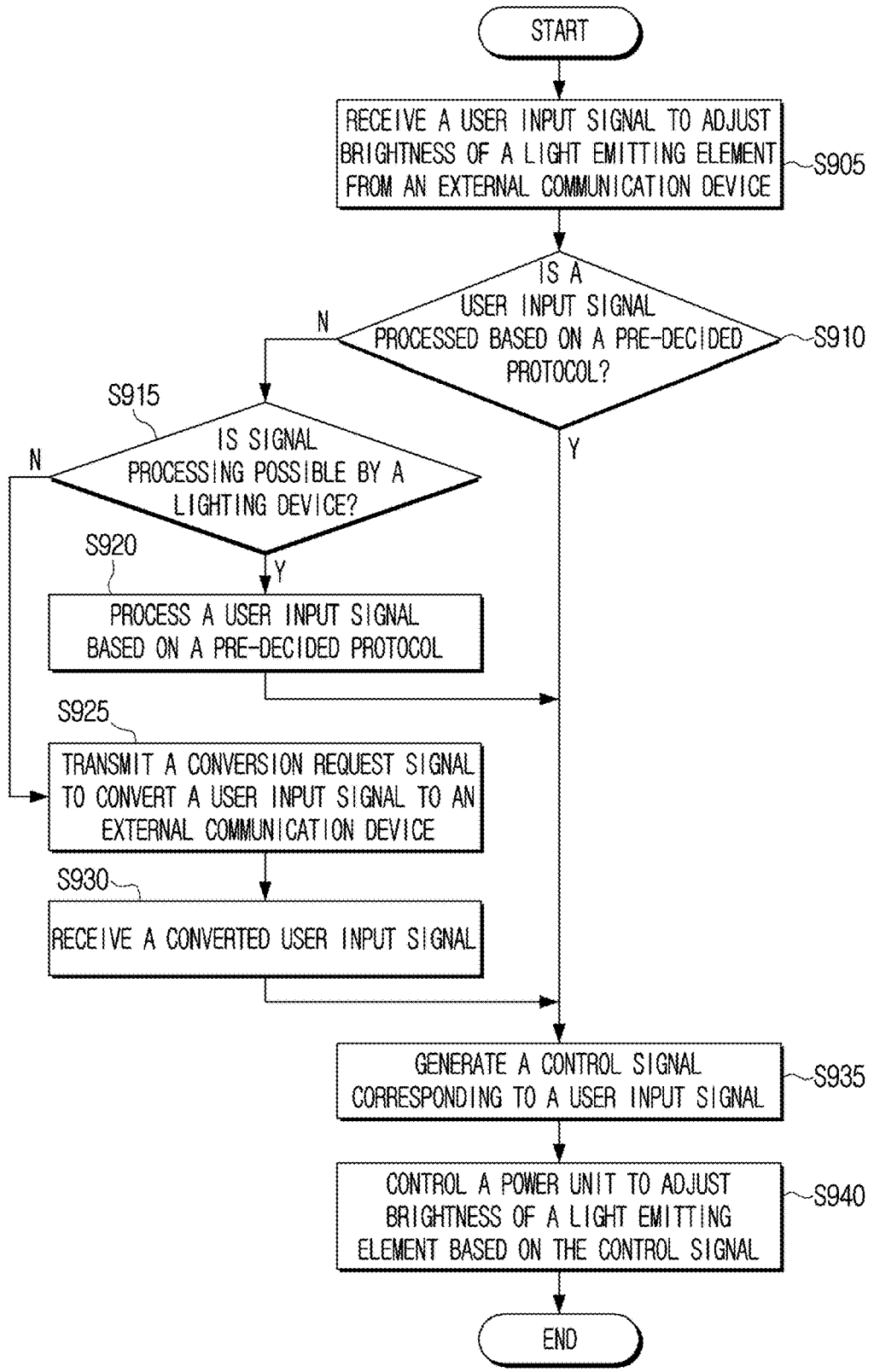
FIG. 9 is a flowchart illustrating a protocol processing operation according to another embodiment.

FIG. 9 is a flowchart illustrating a protocol processing operation according to another embodiment.

Referring to FIG. 9, the lighting device 100 may receive a user input signal to adjust brightness of the light emitting element 110 from the external communication device 200 in operation S905. The lighting device 100 may identify whether the user input signal is processed based on the pre-decided protocol in operation S910.

Based on the received user input signal not being processed based on the pre-decided protocol in operation S910-N, the lighting device 100 may identify whether the lighting device 100 may process a signal internally in operation S915.

If the lighting device 100 is capable of performing signal processing internally in operation S915-Y, the lighting device 100 may process a user input signal based on the pre-decided protocol in operation S920.

If signal processing is not possible in the lighting device 100 in operation S915-N, the lighting device 100 may generate a conversion request signal for converting the user input signal and transmit the converted signal to the external communication device 200. The external communication device 200 may transmit the received conversion request signal to an external server. The external server may receive the conversion request signal to process the user input signal based on the pre-decided protocol. The external server may transmit the converted user input signal to the external communication device 200, and the external communication device 200 may transmit the converted user input signal to the lighting device 100 again. The lighting device 100 may receive the converted user input signal from the external communication device 200 in operation S930.

Based on the received user input signal not being processed based on the pre-decided protocol in operation S910-Y, the lighting device 100 may generate the control signal corresponding to the user input signal in operation S935.

The lighting device 100 may generate the control signal corresponding to the user input signal (processed based on the pre-decided protocol) obtained in operations S920 and S930 in operation S935.

The lighting device 100 may control the power unit 150 to adjust the brightness of the light emitting element 110 based on the generated control signal in operation S 940. Specifically, the lighting device 100 may transmit a control signal to the power unit 150 to supply power from the power unit 150 to the light emitting element.

Figure 10:
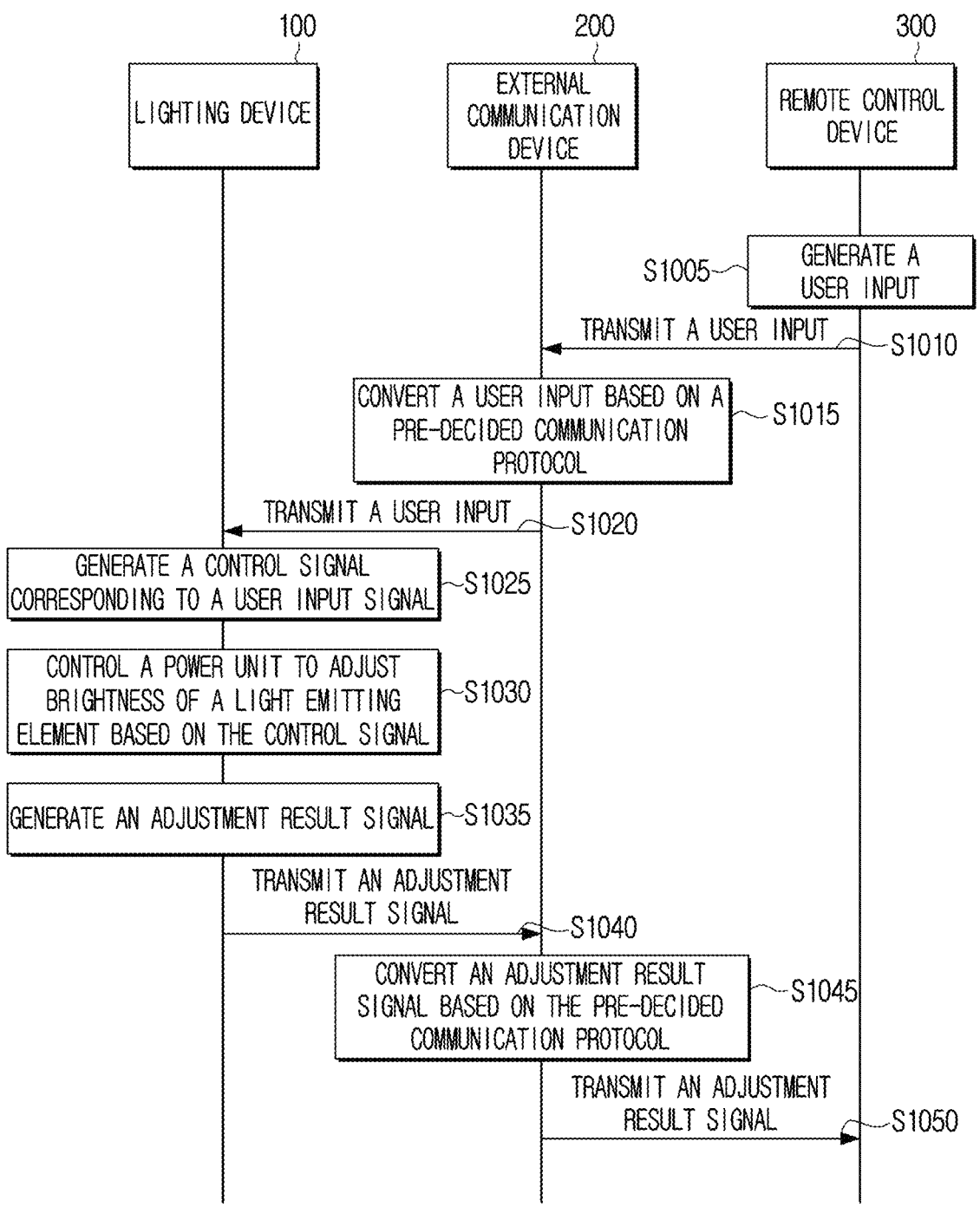
FIG. 10 is a flowchart illustrating a protocol conversion operation of a lighting system according to an embodiment.

FIG. 10 is a flowchart illustrating a protocol conversion operation of a lighting system according to an embodiment.

Referring to FIG. 10, the lighting system may include the lighting device 100, the external communication device 200 and the remote control device 300.

The remote control device 300 may receive a user input from a user to generate a user input signal in operation S1005. The remote control device 300 may transmit the user input signal to the external communication device 200. The external communication device 200 may be described as the communication device 200.

The external communication device 200 may receive the user input signal from the remote control device 300 to process (or convert) the user input signal based on the pre-decided communication protocol in operation S1015. The external communication device 200 may transmit the converted user input signal to the lighting device 100 in operation S1020.

The lighting device 100 may receive the converted user input signal and generate a control signal corresponding to the user input signal in operation S1025. The lighting device 100 may control the power unit 150 to adjust the brightness of the light emitting element 110 based on the control signal in operation S1030. After adjusting the brightness of the light emitting element 110, the lighting device 100 may generate an adjustment result signal in operation S1035. The lighting device 100 may transmit an adjustment result signal to the external communication device 200 in operation S1040.

The external communication device 200 may receive the adjustment result signal and may process (or convert) the received adjustment result signal based on the predetermined communication protocol in operation S1045. The external communication device 200 may transmit the converted adjustment result signal to the remote control device 300 in operation S1050. According to an implementation example, the remote control device 300 may be a user terminal device.

Figure 11:
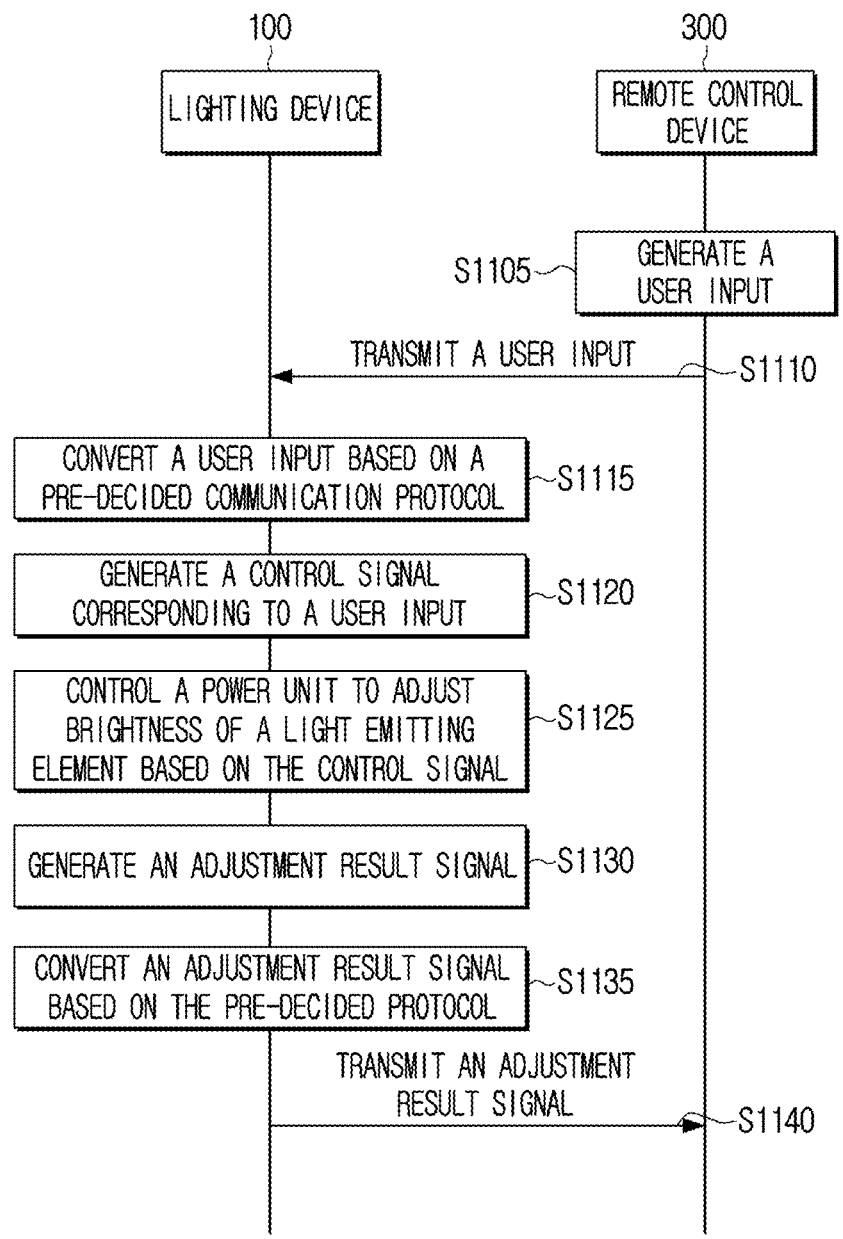
FIG. 11 is a flowchart illustrating a protocol conversion operation of a lighting system according to another embodiment.

FIG. 11 is a flowchart illustrating a protocol conversion operation of a lighting system according to another embodiment.

Referring to FIG. 11, the lighting system may include the lighting device 100 and the remote control device 300.

The remote control device 300 may receive user input from a user to generate a user input signal in operation S1105. The remote control device 300 may transmit the generated user input signal to the lighting device 100 in operation S1110.

The lighting device 100 may process (or convert) the received user input signal based on the predetermined communication protocol in operation S1115. The lighting device 100 may generate a control signal corresponding to the converted user input signal in operation S1120. The lighting device 100 may control the power unit 150 to adjust the brightness of the light emitting element 110 based on the control signal in operation S1125. After adjusting the brightness of the light emitting element 110, the lighting device 100 may generate an adjustment result signal in operation S1130. The lighting device 100 may process (or convert) the adjustment result signal based on the predetermined communication protocol in operation S1135. The lighting device 100 may transmit the converted adjustment result signal to the remote control device 300 in operation S1140.

Figure 12:
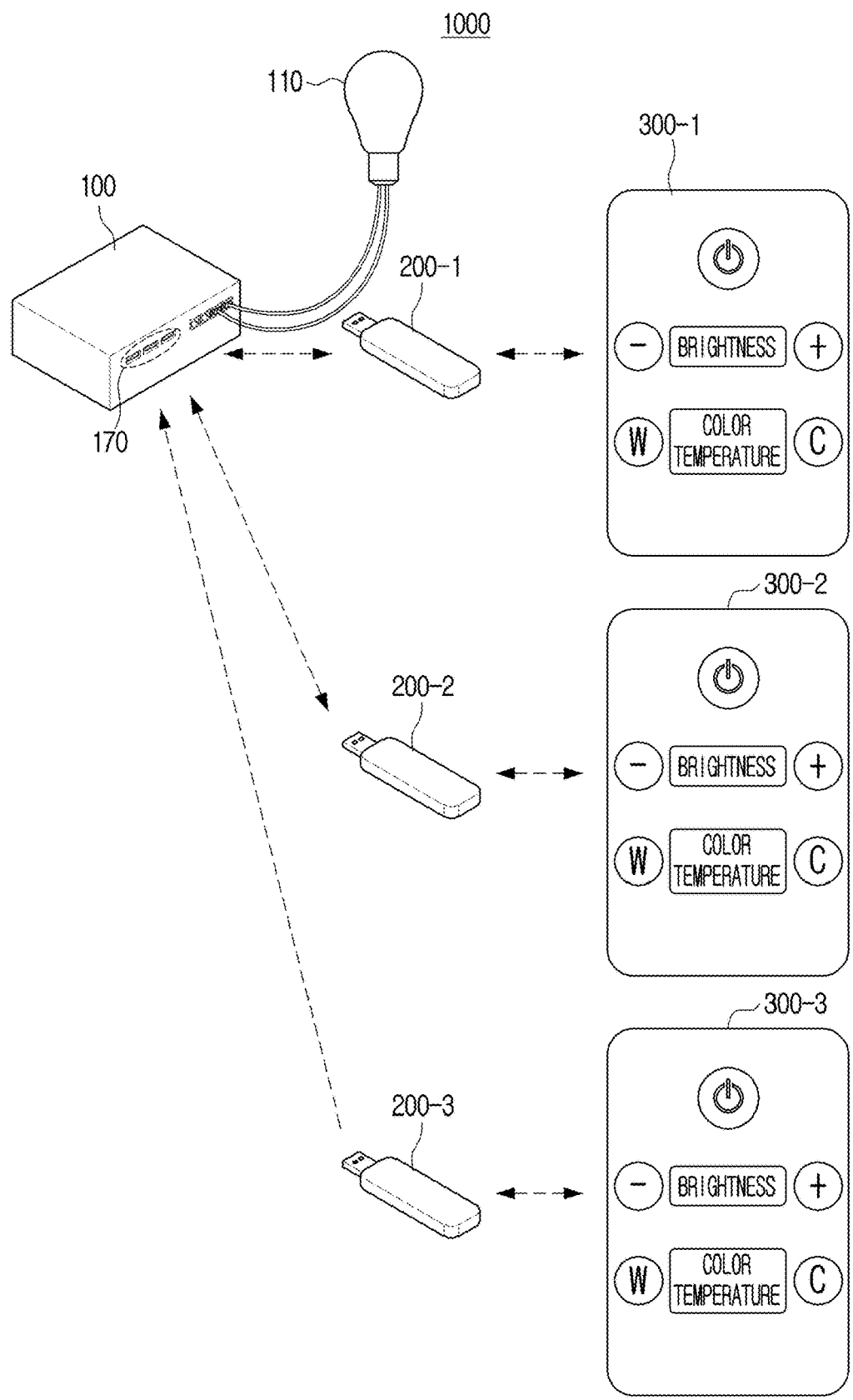
FIG. 12 illustrates a lighting system according to another embodiment.

FIG. 12 illustrates a lighting system according to another embodiment.

Referring to FIG. 12, the lighting system 1000 may include the lighting device 100, an external communication device 200-1, 200-2, and 200-3, and a remote control device 300-1, 300-2, and 300-3.

The lighting device 100 may include the light emitting element 110.

The lighting device 100 may include the output terminal 170, and the external communication device 200-1, 200-2, and 200-3 may be in contact and connected to the output terminal 170.

The lighting device 100 may communicate with an external communication device including different communication modules. For example, the external communication device 200-1 may be a device including an infrared communication module and may perform infrared communication with the remote control device 300-1. The external communication device 200-1 may receive a user input signal from the remote control device 300-1 using an infrared communication method. The external communication device 200-1 may transmit the received user input signal to the lighting device 100.

The external communication device 200-2 may be a device including a Bluetooth communication module and may perform Bluetooth communication with the remote control device 300-2. The external communication device 200-2 may receive a user input signal from the remote control device 300-2 using a Bluetooth communication method. The external communication device 200-2 may transmit the received user input signal to the lighting device 100.

The external communication device 200-3 may be a device including a Wi-Fi communication module, and may perform Wi-Fi communication with the remote control device 300-3. The external communication device 200-3 may receive a user input signal from the remote control device 300-3 using a Wi-Fi communication method. The external communication device 200-3 may transmit the received user input signal to the lighting device 100.

Figure 13:
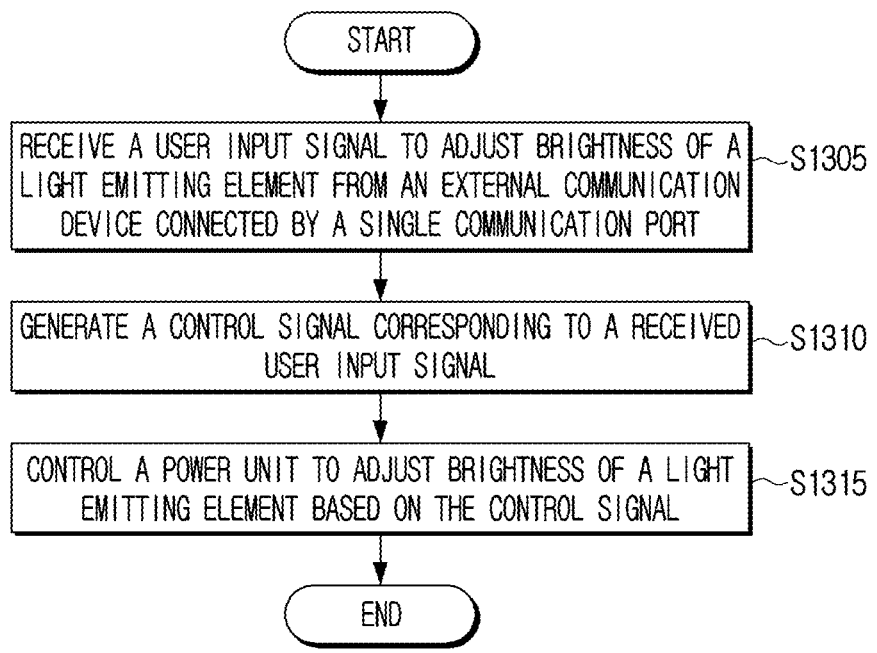
FIG. 13 is a flowchart illustrating a controlling method of a lighting device according to an embodiment.

FIG. 13 is a flowchart illustrating a controlling method of a lighting device according to an embodiment.

Referring to FIG. 13, the controlling method of the lighting device 100 may include receiving a user input signal to adjust brightness of the light emitting element 110 from the external communication device 200 connected by the single communication port 171 of the lighting device 100 through a single communication line connecting the processor 140 of the lighting device 100 and the single communication port 171 in operation S1305, generating a control signal corresponding to the received user input signal in operation S1310, and adjusting the brightness of the lighting emitting element 110 based on the control signal in operation S1310.

The controlling method may further include supplying auxiliary power to the external communication device 200 connected by the single power port 172 of the lighting device 100 through a single power line connecting the auxiliary power source 160 of the lighting device 100 and a single power port.

The controlling method may further include supplying communicating with the external communication device 200 and supplying power to the external communication device 200 through the output terminal 170 including the single communication port 171 and the single power port 172.

The output terminal 170 may be a USB port.

The received user input signal may be processed by the external communication device 200 based on the pre-decided communication protocol, and the controlling method may further include identifying whether the received user input signal has been processed based on the pre-decided protocol and if the received user input signal is not processed based on the pre-decided protocol, processing the received user input signal based on the pre-decided protocol.

The controlling method may further include, based on the received user input signal not being processed based on the pre-decided protocol, generating a conversion request signal for converting the received user input signal, transmitting the generated conversion request signal to the external communication device 200 and receiving the converted user input signal from the external communication device 200.

The method may further include receiving a user input signal via a single communication line, generating an adjustment result signal based on the brightness of the light emitting element 110 being adjusted based on the user input signal, and transmitting the adjustment result signal to the external communication device 200 via a single communication line.

The controlling method may further include receiving communication method information corresponding to the user input signal from the external communication device 200, identifying a communication protocol corresponding to the communication method information, converting the adjustment result signal based on the identified communication protocol, and transmitting the converted adjustment result signal to the external communication device 200 via a single communication line.

The light emitting element 110 may include the first light emitting element 111 having a first color temperature and the second light emitting element 112 having a second color temperature, and the controlling method may further include identifying a total supply current of the lighting device 100, identifying ratio information between the brightness of the first light emitting element 111 and the brightness of the second light emitting element 112 based on the user input, and supplying the identified total supply current to the first light emitting element 111 and the second light emitting element 112 based on the identified ratio information.

The controlling method may further include identifying the first current supplied to the first light emitting element 111 and the second current supplied to the second light emitting element 112 based on the total supply current and ratio information; controlling the first switching element 121 of the lighting device 100 to supply the first current to the first light emitting element 111; and controlling the second switching element 122 of the lighting device 100 to supply the second current to the second light emitting element 112.

The controlling method of the lighting device shown in FIG. 13 may be performed on a lighting device having the configuration of FIG. 2 or FIG. 3, and may be executed on a lighting device having other configurations.

The methods according to the various embodiments as described above may be implemented as an application format installable in an existing lighting device.

The methods according to the various embodiments as described above may be implemented as software upgrade or hardware upgrade for an existing lighting device.

The various embodiments described above may be performed through an embedded server provided in a lighting device, or an external server of at least one lighting device and a display device.

Meanwhile, various embodiments may be implemented in software, including instructions stored on machine-readable storage media readable by a machine (e.g., a computer). An apparatus may call instructions from the storage medium, and execute the called instruction, including a lighting device according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the respective elements (e.g., module or program) mentioned above may include a single entity or a plurality of entities. According to embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

The foregoing example embodiments and advantages are merely examples and are not to be understood as limiting the disclosure. The present disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. A lighting device comprising:
   a light emitting element;
   a power unit to supply power to the light emitting element;
   a single communication port; and
   a processor to:
   when a user input signal to adjust brightness of the light emitting element is received from a replaceable external communication device physically connected by the single communication port, generate a control signal corresponding to the received user input signal,
   control the power unit to adjust brightness of the light emitting element based on the control signal,
   wherein the signal communication port is connected to the processor via a single communication line, and
   wherein the received user input signal is a signal obtained by processing a received user input based on a pre-decided communication protocol recognizable by the processor by the external communication device.

2. The lighting device of claim 1, further comprising:
   an auxiliary power unit to supply auxiliary power; and
   a single power port,
   wherein the processor controls the auxiliary power unit to supply auxiliary power to the external communication device connected by the single power port, and
   wherein the single power port is connected to the auxiliary power unit via a single power line.

3. The lighting device of claim 2, further comprising:
   an output terminal,
   wherein the output terminal comprises the single communication port and the single power port, and
   wherein the processor communicates with the external communication device through the output terminal and supplies power to the external communication device.

4. The lighting device of claim 3, wherein the output terminal is a universal serial bus (USB) port.

5. The lighting device of claim 1,
   wherein the processor identifies whether the received user input signal is processed based on the pre-decided protocol, and
   when the received user input signal is not processed based on the pre-decided protocol, processes the received user input signal based on the pre-decided protocol.

6. The lighting device of claim 5, wherein the processor, when the received user input signal is not processed based on the pre-decided protocol, generates a conversion request signal to convert the received user input signal,
   transmits the generated conversion request signal to the external communication device, and
   receives a converted user input signal from the external communication device.

7. The lighting device of claim 1, wherein the processor receives the user input signal through the single communication line,
   when brightness of the light emitting element is adjusted based on the user input signal, generates an adjustment result signal, and
   transmits the adjustment result signal to the external communication device through the single communication line.

8. The lighting device of claim 7, wherein the processor receives communication method information corresponding to the user input signal from the external communication device,
   identifies the communication protocol corresponding to the communication method information,
   converts the adjustment result signal based on the identified communication protocol, and
   transmits the converted adjustment result signal to the external communication device through the single communication line.

9. The lighting device of claim 1, wherein the light emitting element comprises:
- a first light emitting element having a first color temperature; and
- a second light emitting element having a second color temperature,
- wherein the processor identifies a total supply current of the lighting device,
- identifies ratio information between brightness of the first light emitting element and brightness of the second light emitting element based on the user input, and
- supplies total supply current to the first light emitting element and the second light emitting element based on the identified ratio information.

10. The lighting device of claim 9, further comprising:
- a first switching element; and
- a second switching element;
- wherein the processor identifies a first current supplied to the first light emitting element and a second current supplied to the second light emitting element based on the total supply current and the ratio information,
- supplies the first current to the first light emitting element by controlling the first switching element, and
- supplies the second current to the second light emitting element by controlling the second switching element.

* * * * *